US011438732B2

(12) United States Patent
Hernoud et al.

(10) Patent No.: US 11,438,732 B2
(45) Date of Patent: Sep. 6, 2022

(54) SYSTEMS AND METHODS FOR MOBILE TRACKING, COMMUNICATIONS AND ALERTING

(71) Applicant: VETRIX, LLC, Dacono, CO (US)

(72) Inventors: Melani S. Hernoud, Dacono, CO (US); Duran David Dunn, Dacono, CO (US)

(73) Assignee: VETRIX, LLC, Dacono, CO (US)

( * ) Notice: Subject to any disclaimer, the term of this patent is extended or adjusted under 35 U.S.C. 154(b) by 0 days.

(21) Appl. No.: 16/800,136

(22) Filed: Feb. 25, 2020

(65) Prior Publication Data

US 2020/0196108 A1    Jun. 18, 2020

Related U.S. Application Data

(63) Continuation of application No. 16/533,693, filed on Aug. 6, 2019, which is a continuation of application
(Continued)

(51) Int. Cl.
*H04W 4/029* (2018.01)
*G01C 21/20* (2006.01)
(Continued)

(52) U.S. Cl.
CPC ........... *H04W 4/029* (2018.02); *G01C 21/20* (2013.01); *H04L 41/06* (2013.01); *H04L 67/18* (2013.01);
(Continued)

(58) Field of Classification Search
None
See application file for complete search history.

(56) References Cited

U.S. PATENT DOCUMENTS

| | | |
|---|---|---|
| 4,803,613 A | 2/1989 | Kametani et al. |
| 5,402,521 A | 3/1995 | Niida et al. |
| (Continued) | | |

FOREIGN PATENT DOCUMENTS

| | | |
|---|---|---|
| JP | 2002-007346 | 1/2002 |
| JP | 2002-073569 | 3/2002 |

OTHER PUBLICATIONS

U.S. Appl. No. 16/740,204, filed Jan. 10, 2020, Hernoud et al.
(Continued)

*Primary Examiner* — German Viana Di Prisco
(74) *Attorney, Agent, or Firm* — Sheridan Ross P.C.

(57) ABSTRACT

A mobile device that can optionally communicate with a server, the mobile device including latitude/longitude determining capabilities, a display, a data communication system and a power source. The mobile device can be used to communicate, provide location information, track an individual, as well as allow alerting, such in a case of an emergency. This location information could be accompanied with one or more of video information, audio information, multimedia information, and pictures taken by the mobile device. The mobile devices also allow inner-communicability among the devices such as text messaging, chat, voice communications, and the like. The capabilities of the mobile device can also be used to determine if the device has traversed a geo-fence, or defined electronic perimeter, with the crossing of the perimeter capable of triggering special functionality such as the turning on of the mobile device, or smart phone, sending an alert, altering functionality, or the like.

20 Claims, 25 Drawing Sheets

Related U.S. Application Data

No. 16/207,323, filed on Dec. 3, 2018, now abandoned, which is a continuation of application No. 15/658,568, filed on Jul. 25, 2017, now abandoned, which is a continuation of application No. 15/375,775, filed on Dec. 12, 2016, now abandoned, which is a continuation of application No. 15/097,752, filed on Apr. 13, 2016, now abandoned, which is a continuation of application No. 13/254,898, filed as application No. PCT/US2010/026316 on Mar. 5, 2010, now abandoned.

(60) Provisional application No. 61/263,446, filed on Nov. 23, 2009, provisional application No. 61/158,130, filed on Mar. 6, 2009.

(51) Int. Cl.
   *H04L 67/52* (2022.01)
   *H04L 41/06* (2022.01)
   *H04W 4/14* (2009.01)
   *H04M 3/42* (2006.01)
   *H04L 67/104* (2022.01)
   *H04W 88/02* (2009.01)

(52) U.S. Cl.
   CPC ............ *H04W 4/14* (2013.01); *H04L 67/104* (2013.01); *H04M 3/42127* (2013.01); *H04M 2242/30* (2013.01); *H04W 88/02* (2013.01)

(56) References Cited

U.S. PATENT DOCUMENTS

| | | | |
|---|---|---|---|
| 5,596,652 | A | 1/1997 | Piatek et al. |
| 5,793,882 | A | 8/1998 | Piatek et al. |
| 5,987,611 | A | 11/1999 | Freund |
| 6,144,993 | A | 11/2000 | Fukunaga et al. |
| 6,154,843 | A | 11/2000 | Hart, Jr. et al. |
| 6,330,572 | B1 | 12/2001 | Sitka |
| 6,504,479 | B1 | 1/2003 | Lemons et al. |
| 6,609,128 | B1 | 8/2003 | Underwood |
| 6,640,144 | B1 | 10/2003 | Huang et al. |
| 6,658,091 | B1 | 12/2003 | Naidoo et al. |
| 6,661,340 | B1 | 12/2003 | Saylor et al. |
| 6,720,861 | B1 | 4/2004 | Rodenbeck et al. |
| 6,735,630 | B1 | 5/2004 | Gelvin et al. |
| 6,761,312 | B2 | 7/2004 | Piatek et al. |
| 6,862,708 | B1 | 3/2005 | Higginbotham et al. |
| 6,983,202 | B2 | 1/2006 | Sanqunetti |
| 7,047,092 | B2 | 3/2006 | Wimsatt |
| 7,062,489 | B1 | 6/2006 | Gebauer et al. |
| 7,113,090 | B1 | 9/2006 | Saylor et al. |
| 7,149,533 | B2 | 12/2006 | Laird et al. |
| 7,152,045 | B2 | 12/2006 | Hoffman |
| 7,191,934 | B2 | 3/2007 | Miller et al. |
| 7,277,018 | B2 | 10/2007 | Reyes et al. |
| 7,327,258 | B2 | 2/2008 | Fast et al. |
| 7,437,755 | B2 | 10/2008 | Farino et al. |
| 7,486,185 | B2 | 2/2009 | Culpepper et al. |
| 7,494,060 | B2 | 2/2009 | Zagami et al. |
| 7,552,467 | B2 | 6/2009 | Lindsay |
| 7,696,872 | B2 | 4/2010 | Burwell et al. |
| 7,719,425 | B2 | 5/2010 | Colby |
| 7,748,046 | B2 | 6/2010 | Johnson et al. |
| 7,752,652 | B2 | 7/2010 | Prokupets et al. |
| 7,768,379 | B2 | 8/2010 | Bonalle et al. |
| 7,934,102 | B2 | 4/2011 | Aull et al. |
| 8,073,921 | B2 | 12/2011 | Thomas et al. |
| 8,108,914 | B2 | 1/2012 | Hernoud et al. |
| 8,145,241 | B2 | 3/2012 | Singh et al. |
| 8,326,957 | B2 | 12/2012 | Igarashi |
| 8,854,177 | B2 | 10/2014 | Pinneau et al. |
| 8,937,658 | B2 | 1/2015 | Hicks, III et al. |
| 9,032,097 | B2 | 5/2015 | Albanese et al. |
| 9,400,881 | B2 | 7/2016 | Hernoud et al. |
| 2001/0009015 | A1 | 7/2001 | Mousseau et al. |
| 2001/0042045 | A1 | 11/2001 | Howard et al. |
| 2002/0026577 | A1 | 2/2002 | Futamura et al. |
| 2002/0099945 | A1 | 7/2002 | McLintock et al. |
| 2002/0149467 | A1 | 10/2002 | Calvesio et al. |
| 2002/0180579 | A1 | 12/2002 | Nagaoka et al. |
| 2003/0005326 | A1 | 1/2003 | Flemming |
| 2003/0023518 | A1 | 1/2003 | Spriggs et al. |
| 2003/0023874 | A1 | 1/2003 | Prokupets et al. |
| 2003/0126465 | A1 | 7/2003 | Tassone et al. |
| 2003/0154397 | A1 | 8/2003 | Larsen |
| 2003/0169337 | A1 | 9/2003 | Wilson et al. |
| 2003/0182431 | A1 | 9/2003 | Sturniolo et al. |
| 2003/0195861 | A1 | 10/2003 | McClure et al. |
| 2003/0233583 | A1 | 12/2003 | Carley |
| 2004/0021778 | A1 | 2/2004 | Oldani et al. |
| 2004/0162076 | A1 | 8/2004 | Chowdry et al. |
| 2004/0199768 | A1 | 10/2004 | Nail |
| 2004/0233983 | A1 | 11/2004 | Crawford |
| 2004/0260427 | A1 | 12/2004 | Wimsatt |
| 2005/0007451 | A1 | 1/2005 | Chiang |
| 2005/0027987 | A1 | 2/2005 | Neufeld et al. |
| 2005/0048997 | A1 | 3/2005 | Grobler et al. |
| 2005/0055567 | A1 | 3/2005 | Libin et al. |
| 2005/0066043 | A1 | 3/2005 | Wallman |
| 2005/0071650 | A1 | 3/2005 | Jo et al. |
| 2005/0073982 | A1 | 4/2005 | Corneille et al. |
| 2005/0080909 | A1 | 4/2005 | Panasyuk et al. |
| 2005/0138380 | A1 | 6/2005 | Federonic et al. |
| 2005/0171787 | A1 | 8/2005 | Zagami |
| 2005/0177716 | A1 | 8/2005 | Ginter et al. |
| 2005/0219044 | A1 | 10/2005 | Douglass |
| 2005/0222933 | A1 | 10/2005 | Wesby |
| 2005/0273774 | A1 | 12/2005 | Heinz |
| 2006/0007015 | A1 | 1/2006 | Krzyzanowski et al. |
| 2006/0062201 | A1 | 3/2006 | Funk et al. |
| 2006/0109113 | A1 | 5/2006 | Reyes et al. |
| 2006/0138224 | A1 | 6/2006 | Azami et al. |
| 2006/0148522 | A1 | 7/2006 | Chipchase et al. |
| 2006/0154642 | A1 | 7/2006 | Scannell, Jr. |
| 2006/0173985 | A1 | 8/2006 | Moore |
| 2006/0200658 | A1 | 9/2006 | Penkethman |
| 2007/0030120 | A1 | 2/2007 | Gusse et al. |
| 2007/0043954 | A1 | 2/2007 | Fox |
| 2007/0064109 | A1 | 3/2007 | Renkis |
| 2007/0067642 | A1 | 3/2007 | Singhal |
| 2007/0074041 | A1 | 3/2007 | Aull et al. |
| 2007/0081512 | A1 | 4/2007 | Takeda et al. |
| 2007/0089163 | A1 | 4/2007 | Denton |
| 2007/0094716 | A1 | 4/2007 | Farino et al. |
| 2007/0186106 | A1 | 8/2007 | Ting |
| 2007/0223685 | A1 | 9/2007 | Boubion et al. |
| 2007/0250920 | A1 | 10/2007 | Lindsay |
| 2008/0052245 | A1 | 2/2008 | Love |
| 2008/0086497 | A1 | 4/2008 | Wallace et al. |
| 2008/0091681 | A1 | 4/2008 | Dwivedi et al. |
| 2008/0137593 | A1 | 6/2008 | Laudermilch et al. |
| 2008/0162364 | A1 | 7/2008 | Martin et al. |
| 2008/0177864 | A1 | 7/2008 | Minborg et al. |
| 2008/0209506 | A1 | 8/2008 | Ghai et al. |
| 2009/0016496 | A1* | 1/2009 | Bulmer ................ G06Q 10/10 379/45 |
| 2009/0042604 | A1 | 2/2009 | Fizquette |
| 2009/0044250 | A1 | 2/2009 | Krahn et al. |
| 2009/0077623 | A1 | 3/2009 | Baum et al. |
| 2009/0115570 | A1 | 5/2009 | Cusack, Jr. |
| 2009/0216587 | A1 | 8/2009 | Dwivedi et al. |
| 2009/0247189 | A1* | 10/2009 | Sennett ................ H04L 67/18 455/456.2 |
| 2009/0254392 | A1 | 10/2009 | Zander |
| 2010/0106801 | A1* | 4/2010 | Bliss ................ G06F 16/9537 709/219 |
| 2010/0283579 | A1 | 11/2010 | Kraus et al. |
| 2011/0314515 | A1 | 12/2011 | Hernoud et al. |
| 2012/0064921 | A1 | 3/2012 | Hernoud et al. |
| 2012/0084843 | A1 | 4/2012 | Hernoud et al. |
| 2016/0026785 | A1 | 1/2016 | Hernoud et al. |
| 2016/0227376 | A1 | 8/2016 | Hernoud et al. |

(56) References Cited

U.S. PATENT DOCUMENTS

| | | | |
|---|---|---|---|
| 2016/0292459 | A1 | 10/2016 | Hernoud et al. |
| 2017/0094474 | A1 | 3/2017 | Hernoud et al. |
| 2017/0126744 | A1 | 5/2017 | Hernoud et al. |
| 2017/0169698 | A1 | 6/2017 | Hernoud et al. |
| 2017/0332204 | A1 | 11/2017 | Hernoud et al. |
| 2017/0374105 | A1 | 12/2017 | Hernoud et al. |
| 2019/0075135 | A1 | 3/2019 | Hernoud et al. |
| 2019/0188993 | A1 | 6/2019 | Hernoud et al. |
| 2019/0364389 | A1 | 11/2019 | Hernoud et al. |
| 2020/0304999 | A1 | 9/2020 | Hermoud et al. |

OTHER PUBLICATIONS

Arata, Michael "One system, indivisible: A successful integration must be planned in advance. (System Integration).(fire alarms and security systems)" Security Management, American Society for Industrial Security, Jan. 1, 2002 vol. 46, Issue 1, p. 79(3).

D'Agostino et al., "The Roles of Authentication, Authorization, & Cryptography in Expanding Security Industry Technology," Security Industry Association (SIA) Quarterly Technical Update, Dec. 2005, pp. 1-32.

FIPS PUB 201 Federal Information Processing Standards Publication "Personal Identity Verification (PIV) of Federal Employees and Contractors", Computer Security Division, Feb. 25, 2005, pp. ii-77.

"Mobile Virtual GIS Workgroup" Virtual GIS, Japan, Ohmsha, Ltd., Jun. 30, 2005, First Edition, pp. 41-65 and pp. 165-184.

"Personal Identity Verification (PIV) of Federal Employees and Contractors," Federal Information Processing Standards, FIPS PUB 201, Feb. 25, 2011, pp. ii-77 (87 pages).

Hernoud, "The Mountains That Won't Talk—Silos of Security Disciplines," GSLC V1.0, Melani Hernoud, Sans Institute 2003, As part of GIAC practical repository, 4 pages.

Shiraishi, Akira "Information Security to Support Future Business" Business Communication, Japan, Business Communication Sha Ltd., Mar. 1, 1996, vol. 33, No. 3, pp. 43-46.

International Search Report for International (PCT) Application No. PCT/US07/67404, dated Feb. 29, 2008.

Written Opinion for International (PCT) Application No. PCT/US07/67494, dated Feb. 29, 2008.

International Preliminary Report on Patentability for International (PCT) Application No. PCT/US07/67404, dated Nov. 6, 2008.

Official Action for Australian Application No. 2007290309, dated Sep. 15, 2010.

Notice of Acceptance for Australian Application No. 2007290309, dated May 22, 2012.

Official Action for Australian Application No. 2012216309, dated Feb. 6, 2014.

Examiner's Report for Canadian Patent Application No. 2,650,014, dated Dec. 9, 2014.

Official Action for European Patent Application No. 07840154.4, dated Mar. 13, 2012.

Extended Search Report for European Patent Application No. 07840154.4, dated Feb. 23, 2012 7 pages.

Official Action for Israel Patent Application No. 194713, dated Jun. 5, 2012.

Official Action for Israel Patent Application No. 194713, dated Aug. 21, 2013.

Notice of Allowance and translation for Israel Patent Application No. 194713, dated Oct. 20, 2013.

First Examination Report for Indian Patent Application No. 4254/KOLNP/2008, dated Feb. 23, 2015.

Official Action (including translation) for Japanese Patent Application No. 2009-507941 dated May 7, 2012.

Official Action (including translation) for Japanese Patent Application No. 2009-507941 dated Jan. 7, 2013.

Decision of Final Rejection for Japanese Patent Application No. 2009-507941 dated Sep. 9, 2013.

Official Action (including translation) for Japanese Patent Application No. 2013-140849 dated May 19, 2014.

Decision of Refusal (including translation) for Japanese Patent Application No. 2013-140849 dated Dec. 8, 2014.

Official Action for Philippine Patent Application No. 1-2008-502291, dated Sep. 16, 2011.

Official Action for Philippine Patent Application No. 1-2008-502291, dated Jun. 21, 2012.

Examination Report for New Zealand Patent Application No. 572230, dated Apr. 21, 2010.

Examination Report for New Zealand Patent Application No. 595899, dated Oct. 26, 2011.

Examination Report for New Zealand Patent Application No. 595899, dated May 22, 2012.

Examination Report and Notice of Acceptance of Complete Specification for New Zealand Patent Application No. 595899, dated Jun. 20, 2012.

Notification of Acceptance for South Africa Patent Application No. 2008/08976 dated Nov. 2, 2009.

International Search Report for International (PCT) Patent Application No. PCT/US10/20244, dated Mar. 29, 2010.

Written Opinion for International (PCT) Patent Application No. PCT/US10/20244, dated Mar. 29, 2010.

International Preliminary Report on Patentability for International (PCT) Patent Application No. PCT/US10/20244, dated Jul. 21, 2011.

Office Action for Canadian Patent Application No. 2,785,611, dated Jun. 13, 2014.

Office Action for Canadian Patent Application No. 2,785,611, dated Jul. 23, 2015.

International Search Report for International (PCT) Application No. PCT/US2010/026316, dated May 11, 2010.

Written Opinion for International (PCT) Application No. PCT/US2010/026316, dated May 11, 2010.

International Preliminary Report on Patentability for International (PCT) Application No. PCT/US2010/026316, dated Sep. 15, 2011.

Official Action for U.S. Appl. No. 11/740,063, dated Sep. 1, 2010.

Official Action for U.S. Appl. No. 11/740,063, dated May 9, 2011.

Official Action for U.S. Appl. No. 11/740,063, dated Oct. 4, 2011.

Notice of Allowance for U.S. Appl. No. 11/740,063, dated Dec. 1, 2011.

Official Action for U.S. Appl. No. 13/314,335, dated Oct. 30, 2013.

Official Action for U.S. Appl. No. 13/314,335, dated Jun. 13, 2014.

Official Action for U.S. Appl. No. 13/314,335, dated Jan. 22, 2015.

Official Action for U.S. Appl. No. 14/802,660, dated Nov. 20, 2015.

Notice of Allowance for U.S. Appl. No. 14/802,660, dated Apr. 13, 2016.

Official Action for U.S. Appl. No. 15/187,208, dated Jul. 19, 2016.

Official Action for U.S. Appl. No. 15/409,780 dated Feb. 17, 2017.

Official Action for U.S. Appl. No. 15/679,941 dated Oct. 4, 2017.

Official Action for U.S. Appl. No. 15/679,941 dated May 4, 2018.

Office Action for U.S. Appl. No. 16/176,212, dated Jul. 10, 2019.

Official Action for U.S. Appl. No. 13/143,431 dated Jul. 17, 2013.

Official Action for U.S. Appl. No. 13/143,431 dated May 1, 2014.

Official Action for U.S. Appl. No. 13/143,431 dated Apr. 3, 2015.

Official Action for U.S. Appl. No. 14/874,742 dated Mar. 22, 2016.

Official Action for U.S. Appl. No. 14/874,742 dated Oct. 26, 2016.

Official Action for U.S. Appl. No. 15/443,796 dated Aug. 7, 2018.

Official Action for U.S. Appl. No. 13/254,898, dated May 23, 2013.

Official Action for U.S. Appl. No. 13/254,898, dated Jan. 29, 2014.

Official Action for U.S. Appl. No. 13/254,898, dated Feb. 24, 2015.

Official Action for U.S. Appl. No. 13/254,898, dated Oct. 15, 2015.

Official Action for U.S. Appl. No. 15/097,752 dated Jun. 13, 2016.

Official Action for U.S. Appl. No. 15/375,775 dated Jan. 26, 2017.

Official Action for U.S. Appl. No. 15/658,568 dated Nov. 1, 2017.

Official Action for U.S. Appl. No. 15/658,568 dated Jun. 4, 2018.

Official Action for U.S. Appl. No. 16/207,323 dated Feb. 8, 2019.

Official Action for U.S. Appl. No. 16/533,693 dated Aug. 26, 2019.

Official Action for U.S. Appl. No. 16/270,430 dated Dec. 9, 2019.

Official Action for U.S. Appl. No. 16/740,204, dated Dec. 30, 2020, 9 pages.

Official Action for U.S. Appl. No. 16/740,204, dated Apr. 19, 2021, 32 pages.

Official Action for U.S. Appl. No. 16/896,914, dated Dec. 21, 2021, 11 pages.

(56) References Cited

OTHER PUBLICATIONS

Official Action for U.S. Appl. No. 16/740,204, dated Nov. 24, 2021, 34 pages.
Official Action for U.S. Appl. No. 16/896,914, dated Jun. 30, 2022, 11 pages.
Official Action for U.S. Appl. No. 16/740,204, dated Jun. 21, 2022, 31 pages.

* cited by examiner

Fig. 6

SYSTEMS AND METHODS FOR MOBILE TRACKING, COMMUNICATIONS AND ALERTING

RELATED APPLICATION DATA

This application is a continuation of Application Ser. No. 16/533,693, filed Aug. 6, 2019, entitled "Systems and Methods for Mobile Tracking, Communications and Alerting," which is a continuation of application Ser. No. 16/207,323, filed Dec. 3, 2018, entitled "Systems and Methods for Mobile Tracking, Communications and Alerting," which is a continuation of application Ser. No. 15/658,568, filed Jul. 25, 2017, entitled "Systems and Methods for Mobile Tracking, Communications and Alerting," which is a continuation of application Ser. No. 15/375,775, filed Dec. 12, 2016, entitled "Systems and Methods for Mobile Tracking, Communications and Alerting," which is a continuation of application Ser. No. 15/097,752, filed Apr. 13, 2016, entitled "Systems and Methods for Mobile Tracking, Communications and Alerting," which is a continuation of application Serial No. 13/254,898, filed November 28, 2011, entitled "Systems and Methods for Mobile Tracking, Communications and Alerting," which is a 35 U.S.C. § 371 national stage filing of application Ser. No. PCT/US2010/026316, filed Mar. 5, 2010, entitled "Systems and Methods for Mobile Tracking, Communications and Alerting," which claims the benefit of and priority under 35 U.S.C. § 119(e) to U.S. patent application Ser. No. 61/263,446, filed Nov. 23, 2009, entitled "NIMS-IMPACT Mobile Man Down," and U.S. patent application Ser. No. 61/158,130, filed Mar. 6, 2009, entitled "First Responder Access Command & Control," the disclosures of each of which are incorporated herein by reference in their entirety.

FIELD

An exemplary embodiment of this invention relates to an architecture supporting one or more of tracking, communications, and alerting. More specifically, an exemplary embodiment of this invention is related to one or more of a client-server and client-client system that provides the ability to one or more of track, communicate, alert, and log information.

BACKGROUND

First responders, public safety officials, military and others have experienced difficulties in communicating with each other, especially during an emergency, for various reasons. For example, there have been reported instances where firefighters and police officers in an emergency type situation having not been able to communicate with each other, even though they are using equipment from the same vender. Most of the types of communication devices available are simple devices that allow, for example, walky-talky type communicability among one or more individuals.

SUMMARY

While many previously separate devices are being collapsed into multi-function devices versus separate or partially converged devices, there are a tremendous amount of drawbacks associated with these devices. First, they do not allow for richer multimedia-type communicability. Additionally, they lack the ability to capitalize on such technologies as GPS, cell tower triangulation, as well as the richness and dynamism that can be provided by a graphical interface, such as a touch-screen device. Third, they are unable to provide location information.

An exemplary embodiment of this invention is directed toward a mobile device that can optionally communicate with a server, the mobile device including latitude/longitude determining capabilities, a display, a data communication system, and a power source. In operation, and in accordance with one exemplary embodiment, the mobile device can be used to communicate, track an individual, as well as allow alerting, such in a case of an emergency.

For example, assume there is an emergency on the 100 block of Main Street. As first responders begin responding to the emergency, a perimeter, such as a geo-fence, can be established that defines the city block around 100 Main Street. As each first responder arrives, and upon entry into the perimeter, their mobile device can enter a special mode of operation that allows one or more specific types of functionality. For example, upon entry into the perimeter, the mobile device can begin tracking the first responder and optionally forwarding latitude and longitude information regarding the position of the first responder to, for example, a centralized system or one or more other team members.

In accordance with one exemplary embodiment, this location information is sent to a centralized command and control server that facilitates organization of the first responders' activities at the scene of the emergency. As first responders traverse through the scene of the emergency, the mobile device can one or more of automatically, semi-automatically, or upon a user requests, take pictures, video, audio recordings, or in general any capability associated with the mobile device and have this information again sent to the centralized command and control unit (or another team member(s)).

Additionally, provided on the display of the mobile device can be information regarding fellow first responders such that, for example, when responding to a fire emergency, each first responder knows the position of the other first responders in the area. As will be appreciated, this information could be color coded based on the various teams, type of first responder, experience level, capabilities, and the like. For example, individuals associated with ladder team 51 could be shown on the display of the mobile device with red icons, where police are shown with blue icons, and civilians that need rescuing shown with flashing red icons. With this new enhanced type of communicability, additional information can also be sent to the first responders such as, maps, blueprints, and in general any information that can assist the first responders with responding to the emergency. To facilitate communications, each mobile device can be equipped with walky-talky like communications functions, as well as cellular phone functionality, text messaging, SMS, multi-media messaging, and in general any type of communicability that is supported by the mobile device.

Since each mobile device can have a unique identifier, this also allows targeted communications between, for example, the mobile commander and the one or more devices. In accordance with an exemplary embodiment, the mobile commander can send information, messages, video information, multimedia information, pictures, schematics, blue prints, or the like, to one or more groups of people at the emergency. For example, if the mobile commander desires to alert the firefighters of hazardous materials in a particular commercial building on the 100 block of Main Street, this information could be forwarded to all the firefighters mobile devices with, for example, instructions as to precautionary measures that need to be taken because of the hazardous materials.

This could be facilitated by a multiple team view that could be provided to the mobile commander in, for example, a mobile command interface. This mobile command interface could include information about one or more groups, individuals, and mobile devices within, for example, a predefined area. As discussed, this mobile command view could be of the entire block of 100 Main Street that includes, for example, one or more of satellite imagery, topographical information, street map information, radar information, aerial view information, street-view information, schematics or blueprints of one or more facilities within the area, weather information, and in general any information as selected by the mobile commander.

In accordance with another exemplary embodiment, the various views provided to, for example, an incident manager can be scaled, for example, proportional to the incident. For example, in the instance of a national emergency, an entire view of the country can be seen, with each region drillable into to get more specific information about the various teams, first responders, incidents, and activities that are going on within that region. Thus, the system architecture can be scaled to any level, with, for example, a granular level being a single team member at a single incident, all the way up to national or international events. In general, a "management view" of the system can be based on one or more of location information of one or more mobile devices, tracking information associated with the mobile devices, status of the mobile devices, client information about the mobile devices, such as permissions, description of the individual(s) associated with the mobile device, and the like. In addition, the system can be provided with mapping information, access control information, the capability to log one or more aspects of a "mission" as well as the ability to inject one or more applications, as discussed in greater detail hereinafter.

Another exemplary embodiment is directed toward use of the technology herein for facilitating communications, and tracking of, for example, friends and family. This can be illustrated with reference to a simple working example. Say a family decides to go on vacation to a specific theme park. This family has three children and is intending to spend several days at this particular theme park. Upon arrival of the theme park, one of the parents can define the perimeter of the theme park, (or download the perimeter provided by the theme park) and through a management interface, have this perimeter information pushed to each of the children's' mobile devices. Thus, as the family enjoys themselves at the theme park, the parent(s) can be provided real-time, or near-real-time information about the location of each of their children within the theme park.

As will appreciated, and depending on the capabilities of the mobile device, this location information could be accompanied with one or more of video information, audio information, multimedia information, and pictures taken by the mobile device. As discussed, these mobile devices also allow inner-communicability among the family such as text messaging, chat, voice communications, and the like.

One unique aspect of this invention is what happens should one of the children leave the predefined perimeter. As will be appreciated, the departure from the predefined area could be voluntary or, for example, in the case of an abduction not at the choice of the child. Crossing of the perimeter can trigger one or more of special actions, and a special mode of operation of the mobile device to help assist with managing the situation. For example, in an emergency-type situation, assuming there has been an abduction, the mobile device can go into a special emergency mode and not only provide location information to the parent, but also contact the local authorities with location information. This could be coupled with the phone automatically taking certain actions, such as taking photographs, videos, audio information of the surroundings, and having one or more of these types of information forwarded to the parent and/or local authorities. In conjunction with one exemplary embodiment, this special emergency mode type operation can be performed in the background such that neither the user, nor the abductor, would be aware that the mobile device is transmitting this information. Coupled with maintaining current location information, the phone can operate dynamically based on, for example, remaining battery power. This could help ensure the safe recovery of the abducted child. For example, the phone can monitor the battery life remaining and adjust the update frequency of the location-determining processes. In a similar manner, the frequency with which the phone communicates information, such as the location information, audio, video, or multimedia information, can be reduced, to help ensure that the appropriate parties are receiving information from the mobile device for as long as possible, to help ensure safe recovery of the abducted child.

In another example, say where a child voluntary leaves the perimeter, perhaps the child is a teenager simply wanting to cross the street to visit a local fast food chain. Upon the child exiting the perimeter, an alert could be triggered at one or more of the parents' mobile devices, with the immediate communication session established between the parents' device and the child's device. The parent could then query the child and determine the child was simply going to the fast food chain, and would be returning to within the perimeter within 20 minutes. In this instance, there may be no need to contact the local authorities since the child's activity is merely routine.

In another exemplary embodiment, and in a similar manner, the functionality of the mobile device could be used amongst a group of friends who are going hiking. The mobile device could be populated with various maps, such as satellite and/or topographic maps, and can include graphically the position of the other friends on each of the friends' mobile devices. If the mobile device is equipped with a touch-screen interface, by selecting an icon associated with another friend, a user can communicate with that other friend, send information to the other friend, such as a picture, video, text message, or the like. Moreover, the message can be sent to the entire group of friends and information exchanged between any one or more of the group. In the event one member of the group is hurt, the interface can be provided with an "emergency" icon that triggers special functionality of the mobile device. For example, upon selecting the emergency icon, current longitude and latitude information, as well as an automatic picture can be forwarded to one or more of the remaining members of the group. If current latitude and longitude information is not available, the last know good position could be forwarded in a similar way to one or more of the other members of the group. As will be appreciated, this current location information can be determined in accordance with one or more of GPS coordinates, and/or triangulation based on the use of one or more cell phone towers.

To further facilitate communication between one or more mobile devices, another exemplary embodiment is directed toward a peer-to-peer mode that uses Wi-Fi communication, such as 802.11, to establish an add-hoc network between one or more mobile devices. This ad-hoc network can carry information, such as voice information, pictures, videos, multimedia information, or in general, any information between the mobile devices, without requiring the use of a cellular provider.

Another exemplary embodiment is directed toward the ability for one or more devices to control functionality of one or more other devices. For example, over-the-air programming (OTA) that includes, for example, over-the-air service provisioning (OTASP), over-the-air provisioning (OTAP), or over-the-air parameter administration (OTAPA) allow a user a method to distribute software, applications, or parameters, to, for example, a cell phone, smart phone, or a provisioned handset. This provisioning can include one or more of software applications, device functionality settings, service updates, as well as software updates. This type of remote provisioning allows several exemplary features of this invention to be enabled. First, a mode of operation of the smart device can be manipulated. For example, and using an example of a predefined perimeter, devices within that perimeter, or upon entering that perimeter, can be forced into a special mode of operation. Say the perimeter is defined as a movie theatre, and upon entry into the movie theatre perimeter, all devices are provisioned with the appropriate settings to be in a silent-only mode. Similarly, and as discussed above in relation to the child abduction scenario, upon the authorities verifying that the child abduction has occurred, OTA can be utilized to place the mobile device in a special mode of operation that facilitates recovery of the abducted child.

Utilizing OTA, there are tremendous numbers of opportunities available for disseminating information, monitoring devices functionality, and changing the mobile devices operation as will be appreciated from the description of the detail embodiments discussed hereinafter.

Another exemplary embodiment takes advantage of the tracking functionality to facilitate first responder effectiveness. For example, in the event of an evacuation, there are undoubtedly individuals who for whatever reason do not desire to leave their premises. Instead of requiring one or more first responders to ensure the safety of the individual who does not desire to leave, the individual's mobile device can be "tagged" and placed in a special operation mode, thereby allowing the first responders to track the location of that individual. For example, in a first exemplary embodiment, the individual that does not desire to leave can be asked for their phone number, and the first responders forward this phone number to an incident manager that enters it into a centralized command interface (thereby "tagging" the device) that allows the ability to track that mobile device. Furthermore, and as discussed above in relation to the ability to use over-the-air programming, one or more software applications can be injected on the mobile device that provides, for example the individual with one or more icons, such as an emergency icon, and the like that the user can select if they find themselves in trouble.

In accordance with a second exemplary embodiment, a perimeter can be defined and all mobile devices within that perimeter can be "tagged" to allow tracking. Furthermore, the one or more mobile devices within the perimeter can also be injected using, for example, OTA, and populated with, for example, a client application that facilitates their wellbeing. As will be appreciated, this client can also receive emergency information, alert information, directions for local law enforcement officers or in general any information from, for example, an incident commander and/or public service official.

In accordance with yet another exemplary embodiment, one or more mobile devices, within, for example, a predefined area, based on a list of device identifiers, or the like, could surreptitiously be injected with one or more of software applications, information, or the like, to facilitate, for example, incident management. Once injected, the mobile devices could be tracked, and, as discussed above, could receive individual or group instructions or information, evacuation instructions, maps to the closest safe location, or in general any information as will be appreciated from the following detailed description.

Other exemplary embodiments are directed toward one or more of Enterprise-Trac™, Team-Trac™ and Family-Trac™. With each of these different tacking operational modes, various functions can be performed on the mobile device to facilitate the tracking and intercommunications capability between one or more team members, family members, and enterprise members.

In accordance with another exemplary embodiment, the traversing of a geo-fence, or defined electronic perimeter, can also trigger special functionality such as the turning on of the mobile device, or smart phone. For example, most smart phones typically operate in a power-saving mode, even though they are turned "off." In accordance with one exemplary embodiment, even though the phone is turned off from a user's perspective, the location functionality according to this invention could be running in the background, and that location information compared to an electronic perimeter. Upon the traversing of that perimeter, the operation of the mobile device or smart phone could be altered as discussed. This could be used, for example, when a first responder is responding to an incident, and is clearly distracted with the emergency situation. By using this technology, the first responder would not need to remember to turn on their device, but the device could automatically be turned on once they are found to have crossed the perimeter, or entered into the perimeter that was defined as a result of the incident.

In addition to the above functionality, one or more of the server and mobile client can be equipped with logging functionality, this capable of logging any aspect of the server's and/or mobile device's activity. This can include one or more of location information, communications information, multimedia information, video or picture information, software injection information, mode of operation of the device information, and in general any information.

Accordingly, an exemplary embodiment is directed toward enhanced communications.

An additional exemplary aspect is directed toward facilitating communications between one or more mobile devices, such as smart phones, handheld radios, and/or communications devices.

Additional aspects are also directed toward a client-server architecture that facilitates incident management.

Even further aspects are directed toward equipping a mobile device with tracking capability, the tracking information capable of being used for one or more of incident management, search and rescue, family safety, outdoor activities, and the like.

Even further aspects are directed toward a scalable incident management architecture that can be used on one or more of international, national, state, local, or incident-level.

Even further aspects are directed toward a server equipped with one or more of a database having location data, a tracking capability, a status determination capability, access control capabilities, mapping capabilities, logging capabilities, and a software injection capability.

Additional aspects are directed toward a mobile device, such as a smart phone, PDA, cellular phone, dedicated mobile device, handheld radio, or the like, with the ability to maintain one or more client lists, the ability to determine a last known good location, location determining means, perimeter management means, an alerting capability, a logging capability, a communications capability that includes one or more of voice, text, pictures, video, and multimedia information, a mapping capability, a preference capability, as well as peer-to-peer communications capabilities. A mobile device could also be equipped with one or more special operational mode capabilities, such as an emergency mode, a forced wake-up based on one or more of a pre-defined event occurring, or at the request of one or more other users.

Even further aspects of the invention are directed toward an interface, such as a touch-screen interface, provided on the mobile device. The touch-screen interface can include selectable icons, such as one or more of a map icon, a user icon, a voice chat icon, a send help icon, a snapshot icon, a video icon, a silent icon, a private network icon, a connect icon, an inject icon, a command messages icon, a map layers icon, an e-mail icon, a message icon, a settings icon, an about icon, and an exist icon, each with a corresponding functionality.

Even further aspects are directed toward a mobile device with a perimeter management function, that can facilitate one or more of defining a perimeter(s), defining actions that are to occur upon entry into and/or exist from the perimeter, and an operation within the perimeter.

Even further aspects are directed toward a server that is capable of managing one or more other servers, and/or mobile devices within a particular environment.

Even furthers aspects of the invention are directed toward a peer-to-peer communications architecture that allows communications between one or more mobile devices without the need for cellular service.

Even further aspects of the invention are directed toward an injection mode, that is capable of injecting one or more of a software application(s), parameters, and an instruction to one or more mobile devices.

A further aspect of the invention is directed toward dynamically updating a mode of operation based on a sensed battery level.

Additional aspects are directed toward a mobile device having "man down" capabilities that facilitate management of one or more first responders.

Even further aspects are directed toward a mobile device operating with a Man Down client.

Additional aspects are directed toward providing location information for one or more other team members using the man down architecture.

Even further aspects are directed toward providing one or more of a national incident command view, a regional command view, and an incident command view with each view being drillable into for more detailed information.

Additional aspects relate to utilizing detected remaining battery power in a mobile device to affect one or more of update times, operation of and display of maps, and general operation of device.

These and other features and advantages of this invention are described in, or are apparent from, the following detail description of the exemplary embodiments.

BRIEF DESCRIPTION OF THE DRAWINGS

The exemplary embodiments of the invention will be described in detail, with reference to the following figures, wherein:

FIG. 6 illustrates another exemplary settings menu according to this invention;

DETAILED DESCRIPTION

The exemplary embodiments of this invention will be described in relation to communications systems and security systems. However, it should be appreciated, that in general, the systems and methods of this invention will work equally well in other types of communications environments, networks and/or protocols.

The exemplary systems and methods of this invention will also be described in relation to wired and/or wireless communications devices, such as mobile devices, PDA's, cellular phones, radios, Blackberry®, iPhone®, iPad®, mobile computers, laptops, tablet PC's, smart phones, netbooks, and the like. However, to avoid unnecessarily obscuring the present invention, the following description omits well-known structures and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured, and/or encrypted system. One or more of the various components/modules could also be converged into one or more of the other illustrated components/modules.

Thus, it should be appreciated that the components/modules of the system can be combined into one or more devices, such as a mobile device, radio, incident management and tracking system, and the like. As will be appreciated from the following description, and for reasons of computations efficiency, the components of the systems can be arranged at any location within a distributed network without affecting the operation thereof. One or more functional portions of this system could also, for example, be distributed between a mobile device and an associated server.

Furthermore, it should be appreciated that the various links, including the communications channels connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute, and variations thereof, as used herein are used interchangeably and include any type of methodology, process, technique, mathematical operation or protocol.

Figure 1:
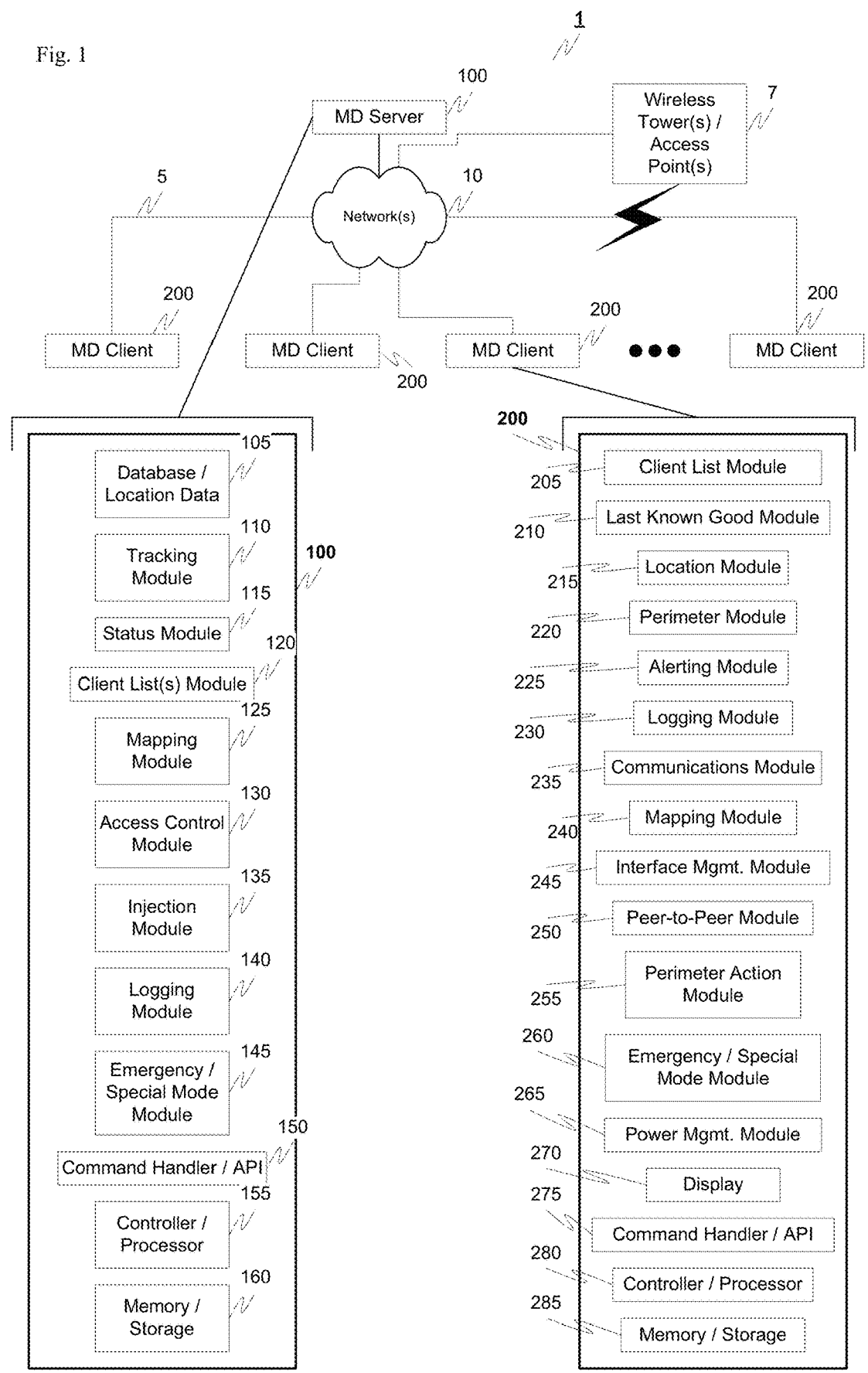
FIG. 1 illustrates an exemplary communications environment according to this invention.

FIG. 1 illustrates an exemplary communications environment according to an exemplary embodiment of this invention. In particular, the communications environment 1 includes one or more servers, such as man down (MD) server 100, and one or more clients, such as man down client 200. The various servers and clients are interconnected via one or more links 5 and networks 10 in cooperation with one or more cellular communications towers and/or access point 7. Each server 100 includes a database 105, tracking module 110, status module 115, client list module 120, mapping module 125, access control module 130, injection module 135, logging module 140, emergency/special mode module 145, command handler/API 150, processor 155 and storage 160.

Each client 200 is an electronic mobile device, such as a PDA, smart phone, radio, cellular phone, or in general any communications device capable of performing any one or more of the functions described herein. An exemplary client 200 includes a client list module 205, a last known good module 210, a location module 215, perimeter module 220, alerting module 225, logging module 230, communications module 235, mapping module 240, interface management module 245, peer-to-peer module 250, perimeter action module 255, emergency/special mode module 260, power management module 265, a display 270, a command handler/API 275, a controller 280, memory 285, and other well known conventional componentry.

In accordance with one exemplary embodiment, the client 200 includes a display 270, such as a touch-screen display and can optionally include one or more of a microphone, camera, video camera, web browser, and multiple communications capabilities, such as cellular, Wi-Fi, Bluetooth®, and in general any communications protocol that allows one or more of transfer of data and/or voice information.

As discussed, one or more of the server 100 and client 200 are capable of intercommunication to facilitate one or more of tracking, first responder communication, information sharing, location identification, team management, and logging, just to name a few.

The client 200 is typically associated with a single individual, however, could also be associated with a team including a plurality of individuals, which may also include equipment and/or additional resources, such as search and rescue dogs, and the like. Additionally, while the exemplary embodiments discussed herein will be directed toward a client being associated with an individual, it should be appreciated that a client could be associated with any one or more human, animal, or tangible assets, such as equipment, supplies, or the like. Furthermore, it should be appreciated that the various clients 200 and server 100 are capable of intercommunication via one or more wired or wireless networks, satellite communications, and in general any communications protocol that is capable of communicating one or more of data and/or voice information.

In general, the server 100 assists with maintaining and managing information regarding one or more clients 200, and also cooperates with one or more clients 200 for certain functionality.

In general, database 105 maintains information about one or more clients 200, such as location data (both current and historical), settings information, user information, device information, and in general any information specific to one or more of the client itself and the associated user, team, equipment, or supplies. The tracking module 110 obtains location information from one or more clients 200, with this location information being stored in the database 105, and the tracking information capable of being displayed on one or more display devices (not shown) that indicate the current location of the client 200. As will be discussed in greater detail hereinafter, the tracking module 110 can coordinate with the mapping module 125 such that one or more maps can be combined and shown with current location information of one or more clients 200. In addition, historical information can be provided on the map, such as the path over which a client 200 has traversed over a particular period of time.

The status module 115 maintains status information such as last known good location, user status, current connectivity status to server 100 and/or one or more other clients 200, and can in general store any information about the status of one or more clients 200.

The mapping module 125 assists with providing maps that may be populated with one or more user's locations, with the mapping module 125 capable of supporting one or more of a street view, topographic view, radar view, aerial view, schematic view, weather-based view, a custom view, as well as one or more of chemical and/or biological information.

The access control module 130 cooperates with the database 105 that in general manages access to the server 100 as well as optionally controls the various types of communications that can be exchanged, user rights and permissions, and in general any functionality associated with user management and administration.

As will be discussed in greater detail hereinafter, the injection module 135 can be used to inject one or more of software, applications, parameters, perimeters, settings, or the like, into one or more clients 200. In addition, the injection module can be used as a remote SMS (Text Messaging) control tool. More specifically, by using a specially crafted SMS message(s) (or comparable message or instruction), the injection module is able to start up one or more applications on the mobile communications remotely and, for example, have the mobile communications device connect to the server and/or another client. The application(s) can be started in a standard mode or a hidden mode (where the user is unaware the application has started/is running).

The logging module 140, again cooperating with the database 105, is capable of logging any one or more aspects of the operation of the server 100 and one or more clients 200.

The emergency/special mode module 145 is in general used to facilitate a special mode of operation and/or special actions that are to occur in the event of an emergency. It should be appreciated however, that the special modes associated with this module are not necessarily emergency dependent, but could be for any type of occasion where a special operational mode is desired.

As discussed, the server 100 will typically be used by an incident commander, manager, parent, supervisor, or other entity in charge of managing, tracking, and directing, one or more clients. As will be appreciated, the server 100 and functionality therein could be accessed via, for example, a mobile device, such as a tablet PC, laptop, or other similar interface that provides visibility into the functionality contained therein. For example, in a first responder type environment, an incident commander could be located in close proximity to an incident and may have a laptop with wireless connectivity that is capable of one or more of controlling, accessing, and displaying information managed by the server 100.

Furthermore, as alluded to earlier, there may be a hierarchy of servers 100, with, for example, a first server managing a local incident, a second server managing a plurality of local incidents, and a third sever managing all incidents on, for example, a national or international basis. As is to be appreciated, the architecture disclosed herein can be scaled as necessary to accommodate the type of environment in which it is deployed. Furthermore and in cooperation with the access control module 130, access and information sharing between one or more servers can be controlled as necessary. For example, in the event of classified information, the dissemination of this information can be restricted in accordance with an access control module rule set as well as rules established that control the flow of information either up the server chain, or down the server chain, including whether or not the information can be disseminated to one or more clients 200. The server 100 may also include similar functionality to that discussed in relation to the client 200, such as communications module 235, which allows for various types of communications to be exchanged therebetween.

Similar high level functionalities associated with the various modules in the client 200 will be highlighted below, with more detail discussions provided hereinafter. More specifically, the client list module 205 maintains one or more client lists, the information contained therein capable of being used with the access control module 130 to manage the interconnectivity of the client 200 with one or more other clients and servers, as well as such information as an "address" that can include information such as phone numbers, IP addresses, device IDs, and the like, to facilitate intercommunicability amongst one or more clients.

The last known good module 210 cooperates with the location module 215 to track and maintain information regarding the last known good location of the client. The last known good module 210 can cooperate with a tracking module 110 and status module 115 to ensure the most up-to-date last known good location is known such that in the event of lost communication between the client and the server (or a GPS satellite), the server, and in particular the status module 115 knows the last known good location of the client. The last known good module 210 also allows for location sensing failover across various triangulation techniques with a 'most accurate' capable of being selected.

The location module 215 is capable of at least determining a current latitude and longitude of the client 200. This can be based on one or more of GPS information, satellite triangulation, cell tower triangulation, or in general any technique that is capable of providing longitude and latitude information. This can also be coupled with altitude information and/or floor information, with the cooperation of, for example, access points within a building. For example, the distance to one or more access points, optionally using triangulation therebetween, can help determine what floor the client is on in, for example, a high rise structure.

The perimeter module 220 allows the creation, maintenance, and editing, of one or more perimeters that are defined by a geographic boundary and can include one or more of latitude, longitude, and altitude information.

The alerting module 225 allows one or more alerts to be received and sent to one or more other clients and servers.

Similar to the logging module 140, the logging module 230 is capable of logging any aspect of the operation of, location of, and user interaction with the client.

The communications module 235 at least enables communications between one or more of other clients, and the server, the communications including one or more of voice information, text information, image information, video information, multimedia information, and in general can include any type of communication with any type of data.

The mapping module 240 is capable of displaying on display 270, in addition to current location information, one or more maps in a similar manner to the mapping module 125. As is to be appreciated, the mapping module can also store maps for one or more areas, or could also coordinate with the mapping module 125 to receive maps in a real-time, or near-real-time manner from any location, such as a location on the internet.

The interface management module 245, is optionally capable of cooperating with the display 270, to allow one or more of user configuration of the client 200, as well as allow the various inputs, settings, and parameters of the client 200 to be manipulated.

The peer-to-peer module 250 allows peer-to-peer connectivity with one or more of other clients, and the server, via one or more of 802.11, Wi-Fi, or in general any data communication protocol that may not be dependent on the availability of a cellular network infrastructure.

The perimeter action module 255 controls one or more actions that can be associated with one or more of entry into a perimeter, exit from a perimeter, or activity within a perimeter.

The emergency/special mode 260 provides one or more emergency or special modes of operation of the client 200, optionally in cooperation with the emergency/special mode 145 module as will be discussed in greater detail hereinafter. Similarly, and as discussed in greater detail hereinafter, the power management module 265 is capable of managing the operation of the client based on one or more of current battery level, mission information, mode of operation, or in general any aspect of the client 200.

The display 270 is capable of being, for example, the black and white or color display, and can optionally be a touch-screen display that is optionally capable of displaying one or more maps in cooperation with the mapping module 240 and the location of one or more of the position of the client, as well as one or more other clients.

Figure 2:
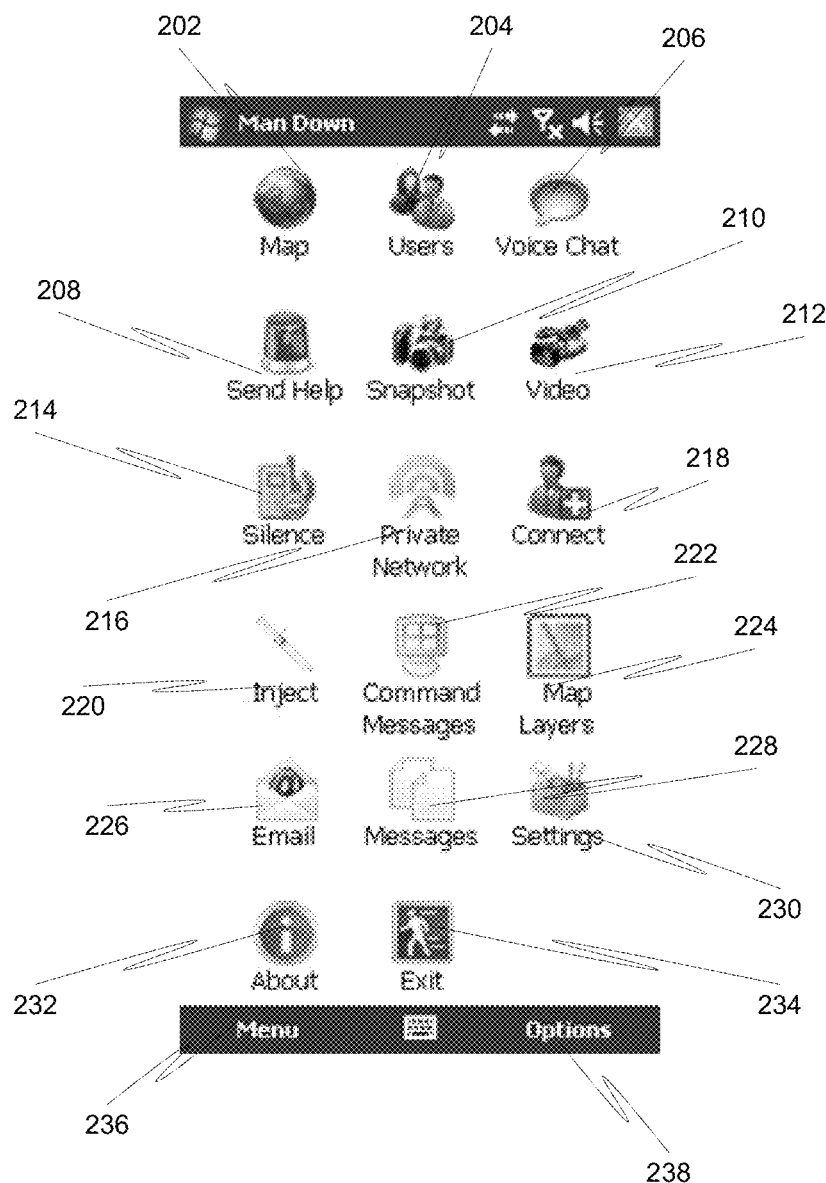
FIG. 2 illustrates an exemplary interface on a Man Down client according to this invention.
Figure 3:
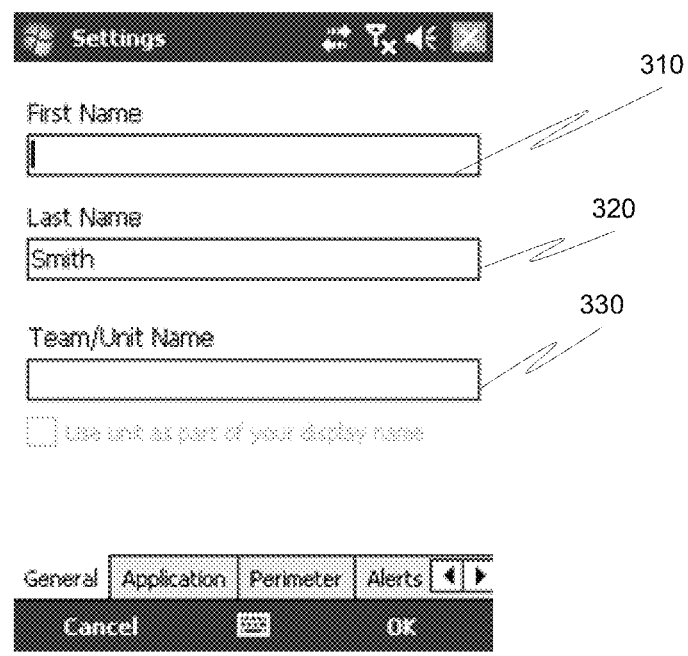
FIG. 3 illustrates an exemplary settings menu according to this invention.

FIG. 2 illustrates an exemplary user interface, the icons therein capable of being displayed on one or more of the client 200, such as on display 270, and the server 100 on an associated display (not shown). In particular, the interface includes a plurality of icons such as map icon 202, user icon 204, voice chat icon 206, send help icon 208, snapshot icon 210, video icon 212, silence icon 214, private network icon 216, connect icon 218, inject icon 220, command messages icon 222, map layer icon 224, e-mail icon 226, message icon 228, settings icon 230, about icon 232, exit icon 234, menu icon 236, and option icon 238, that all have a corresponding function when selected. In addition, other icons that are commonly found on smart phone devices or radios can also be shown such as a signal strength icon, battery icon, volume indicator icon, close application icon, and the like.

Figure 13:
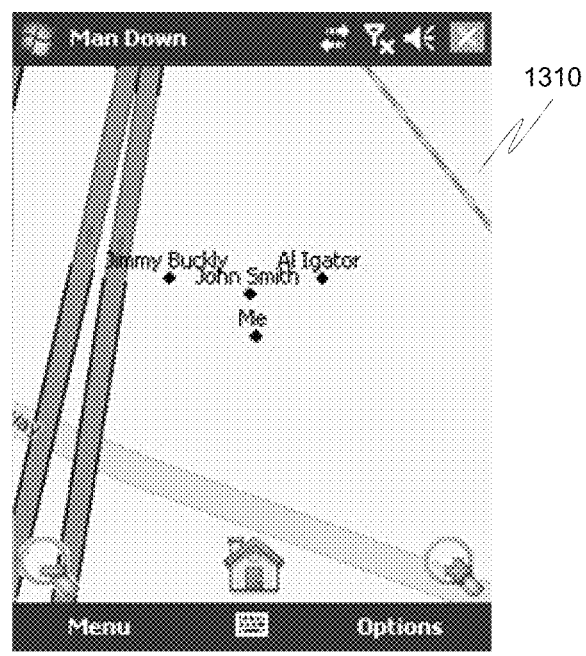
FIG. 13 illustrates an exemplary mapped team according to this invention.

Upon selection of the map icon 202, and in cooperation with the location module 215 and mapping module 240, map and location information, such as that illustrated in FIG. 13, can be displayed to a user. In addition to the current location of the client 200, the map can also be populated with one or more other user's locations, those other user's locations identified by corresponding icon/emoticon and/or textual information, such as GPS coordinates, longitude/latitude information, and/or distance and/or direction from the client.

Upon selection of the user's icon 220, information about one or more users can be displayed. This information can include one or more of device identification information, current location information, name information, nickname information, or in general any information about the associated user or device. Furthermore, and as previously discussed, since the client 200 can be associated with more than just an individual, such as supplies, equipment, or the like, upon selection of the user icon 220, information about what the client is associated with could also be displayed. Optionally, another icon such as "supplies" or "equipment" could be provided to help a user more easily distinguish other clients.

Upon selection of the voice chat icon 206, and with the cooperation of the communications module 235, a voice chat session can be initiated between the client 200 and one or more other clients and/or one or more servers 100. As will be appreciated, based on the various functional modes of operation that are discussed hereinafter, this voice chat communications session can occur over one or more of a wireless network, such as a cellular phone network, via Wi-Fi, and/or via direct connection, such as through a private network. The voice chat functionality can operate in a similar manner to a walky-talky feature that could optionally be enriched with one or more of picture information, video information, and multimedia information.

The send help icon 208, when selected sends an alert, with cooperation of the communications module 235 and alerting module 225 to one or more of additional clients and one or more servers. In addition to a textual, picture-based, video-based, and/or multimedia based alert messages, information about the current location of the client can be provided, as well as, if no current location information is available, the last known good position as recorded by the last known good module 210. In addition to the sending of an alert message, upon selection of the send help icon 208, one or more additional functions can also optionally occur, such as the automatic taking of one or more of pictures and video information that can optionally be sent with the alert message. This picture and/or video information could then be reviewed by the recipient(s) of the alert to, for example, assist with locating the client and/or deriving additional information about the reason of the alert. In addition, upon selection of the send help icon 208, an interface can be provided that allows for the user to enter additional information about the reason for the help request.

The snapshot icon 210, upon selection, cooperates with a camera module (not shown) that allows the user to take one or more images that can be stored on the client 200, in memory 285, that can also optionally be forwarded, in cooperation with communications module 235 to another destination, such as another client 200 or server 100. (See, for example, FIG. 16).

The video icon 212, upon selection, operates in a similar manner to the snapshot functionality, with the user being able to record video from their device. In a similar manner, this video can be stored in a memory 285 and/or distributed to one or more other destinations.

Upon selection of the silence icon 214, and in cooperation with the special mode module 260, a silent mode of operation can be selected for the client 200. Additionally, and based on settings within one or more of the client 200 and server 100, upon selection of this silent mode an instruction can be sent to one or more other devices that forces them into a silent mode with the cooperation of their respective special mode 260.

The private network icon 216, upon selection, allows communication between one or more clients and servers when, for example, a cellular network connection is not available, or when, for example, users opt to communicate sensitive information. Thus, upon selection, the client 200, cooperating with the communications module 235, and peer-to-peer module 250, establishes a wireless connection, such as via Bluetooth®, Wi-Fi, 802.11, or the like to one or more other devices. Once the connection has been completed, any of the functions described herein such as voice chat, sending help, snapshot, video, e-mail, messages, and the like, can be exchanged via the private network in a similar manner, that messages that would be communicated via, for example, a wireless cellular network.

Upon selection of the connect icon 218, and in cooperation with the client list 205, communications module 235, and optionally the peer-to-peer module 250, the client 200 is able to connect to one or more other clients and/or servers. For example, upon selection of the connect icon 218, and in cooperation with interface management module 245, a user interface is provided that allows a user to select one or more users that they would like to connect to. For example, this list can be populated dynamically based on the sensed users within a predefined area, can be pre-configured with an "address book" of users, or the like. Upon connecting to one or more other users, a user can do such things such as send images, video, text messages, e-mails, or in general communicate in any manner with other user(s). In addition, and depending on, for example, one or more permissions and/or the special operational mode of another device, upon connecting, a user may be able to "remote in" to another device and control functionality of that device. For example, a user, having received an alert from another user, may want to requests the other user's device to take a snapshot and forward that snapshot to the individual that received the help request. This could, for example, assist with determining the severity of the situation, or the like.

The inject icon 220, upon selection, allows the injection of one or more of software, an application(s), and/or parameters in the client 200. This can optionally be in cooperation with the injection module 135, as well as the emergency module 260. As discussed, upon selection of the inject icon 220, and optionally based on one or more permissions, information can be downloaded to one or more other devices. This information can be, for example, new software, a software update, command instructions, parameters, or in general any information pertinent to the client 200. Even more particularly, and in accordance with an exemplary embodiment, this can be accomplished via OTA or OTAP and can be used during any operational mode of the device including, for example, when the client 200 is in a power saving or "asleep" mode.

Upon selection of the command messages icon 222, one or more of command messages can be sent from the device to any other device and/or one more servers. These command messages can include, for example, one or more instructions, and similar to the other communications modalities discussed herein, be accompanied with one or more of image information, video information, multimedia information, textual information, or the like.

The map layer icon 224 allows a user to control the layers shown upon selection of the map icon 202. For example, and as discussed in greater detail hereinafter, layers such as topographical, radar, aerial, and the like can be controlled, and well as specifics related thereto governed such as opacity, brightness, color, and in general any characteristic about the map.

The e-mail icon 226, upon selection, and in cooperation with the communications module 235 and interface management module 245, allows a user to send an e-mail. This e-mail could be, for example, textual based, multimedia, or the like, and can be sent to any one or more of the users stored within the device, or in general to any valid e-mail address.

The messages icon 228, upon selection, operates in a similar manner to the voice chat functionality, with the messages being textual or multimedia-based. More specifically, and in cooperation with the communications module 235, interface management module 245, and client list 205, a user can select one or more recipients to receive a message, with an interface then be provided that allows a user to enter message content which can then be sent to the one or more selected recipients.

The settings icon 230, upon selection, allows various settings of the client 200 to be manipulated. Some of the various settings will be discussed hereinafter in relation to FIGS. 3-8.

Upon selection of the about icon 232, information such as device information, power level information, software version information, and the like can be shown about the client 200.

The selection of the exit icon 234 exits the user from the application.

As discussed, additional exemplary selectable icons could also be provided, such as menu icon 236 and options icon 238 that provides standard functionality such as that well known in the smart phone and/or emergency radio environments.

FIGS. 3-8 illustrate exemplary interfaces that can be provided upon selection of the settings icon 230. For example, some of the exemplary settings relate to general settings, application settings, perimeter settings, alert settings, log settings, map settings, and the like. More specifically, FIG. 3 allows the entry of general settings, such as a first name 310, last name 320, and team/unit information 330, capabilities, etc. However, if the client 200 is not associated with a user, and instead is associated with, for example, equipment, supplies, or the like, this interface is amendable so that the appropriate information regarding whatever the client 200 is associated with can be entered.

Figure 4:
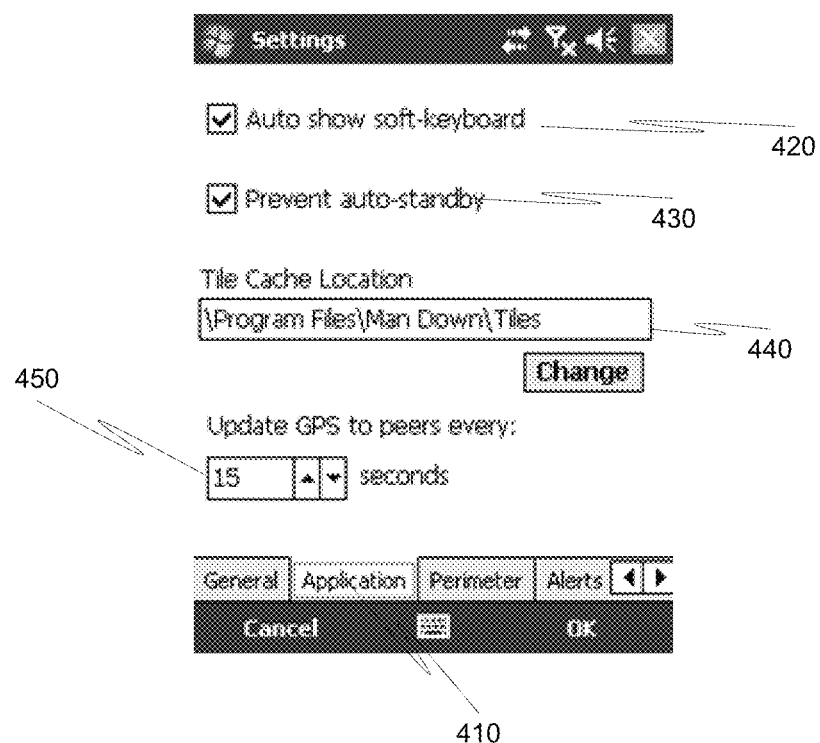
FIG. 4 illustrates another exemplary settings menu according to this invention.

FIG. 4 shows another exemplary settings user interface upon selection of the application tab 410. This interface provides, for example, the ability for the user to select the showing of the soft keyboard via check box 420, the auto-standby functionality via checkbox 430, and the cash storage location via interface portion 440. In addition, the user can select the frequency with which the GPS and/or location information is updated to their peers, via interface 450. As will be discussed in greater detail hereinafter, this update period could be automatically set, based on power management module 265.

Figure 5:
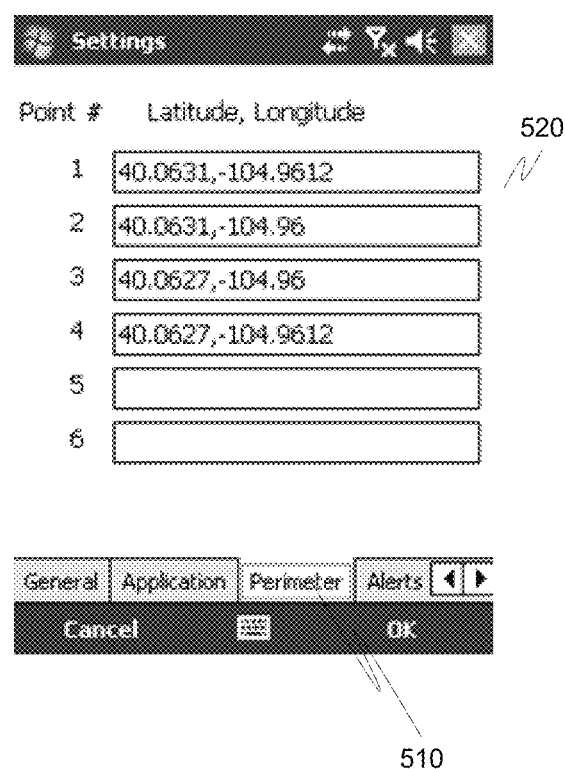
FIG. 5 illustrates another exemplary settings menu according to this invention.

FIG. 5 shows an exemplary interface that can be provided upon selection of the perimeter tab 510. This interface, cooperating with the perimeter module 220, allows on or more perimeters to be defined, such as via their latitude/longitude information 520. This information can be manually entered by a user, or, for example, pushed or downloaded to the client from, for example, server 100.

Interface in FIG. 6 can be displayed upon selection of the alert tabs 610. More specifically, this interface can control what are the actions that are taken, if any, upon the exit (620) or entry (630) from a defined perimeter. In addition to be able to select whether an alert occurs, an additional menu can be optionally provided that allows a user to enter the type of action(s) that could also be automatically triggered upon entry or exit from a perimeter.

Figure 7:
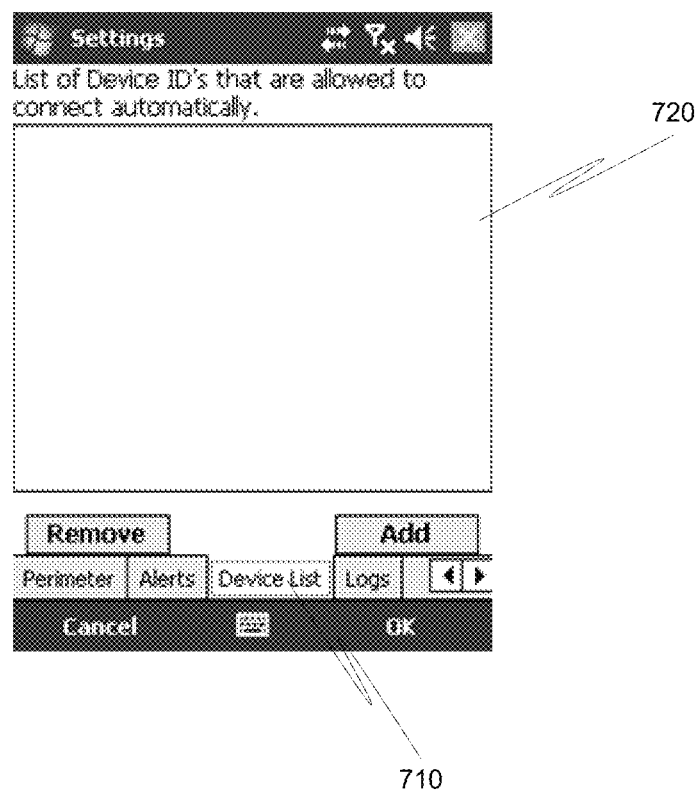
FIG. 7 illustrates another exemplary settings menu according to this invention.

FIG. 7 illustrates an exemplary interface that can be displayed upon selection of the device list tab 710. The device list 710 shows in portion 720, a list of one or more devices that are allowed to connect automatically to the client 200. Using the "add" or "remove" buttons, the user can amend this list as necessary, and optionally, in cooperation with the client list module 205 and associated client list interface.

Figure 8:
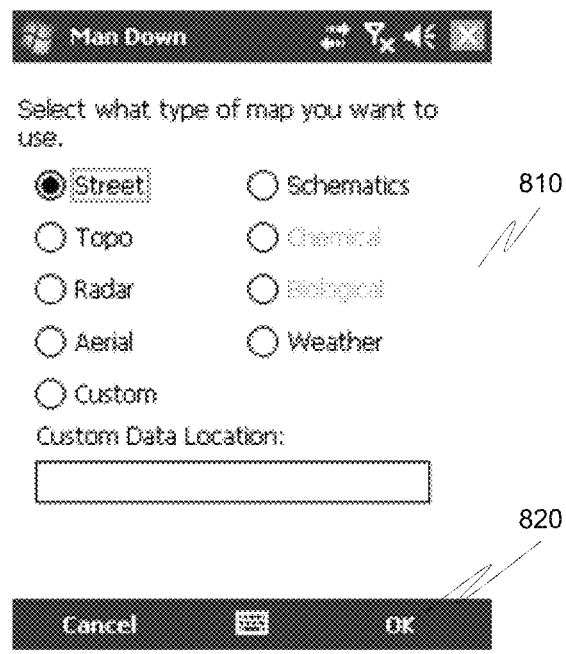
FIG. 8 illustrates exemplary map settings according to this invention.

FIG. 8 illustrates an exemplary interface that allows selection of the one or more map characteristics the user would like to use. For example, and in accordance with one exemplary embodiment, the provided map characteristics are street, topographic, radar, aerial, schematics, chemical, biological, weather, and custom. Upon selection of the OK button 820, and in cooperation with the mapping module 240 and display 270, the displayed map is updated to according to the user selected preferences.

Figure 9:
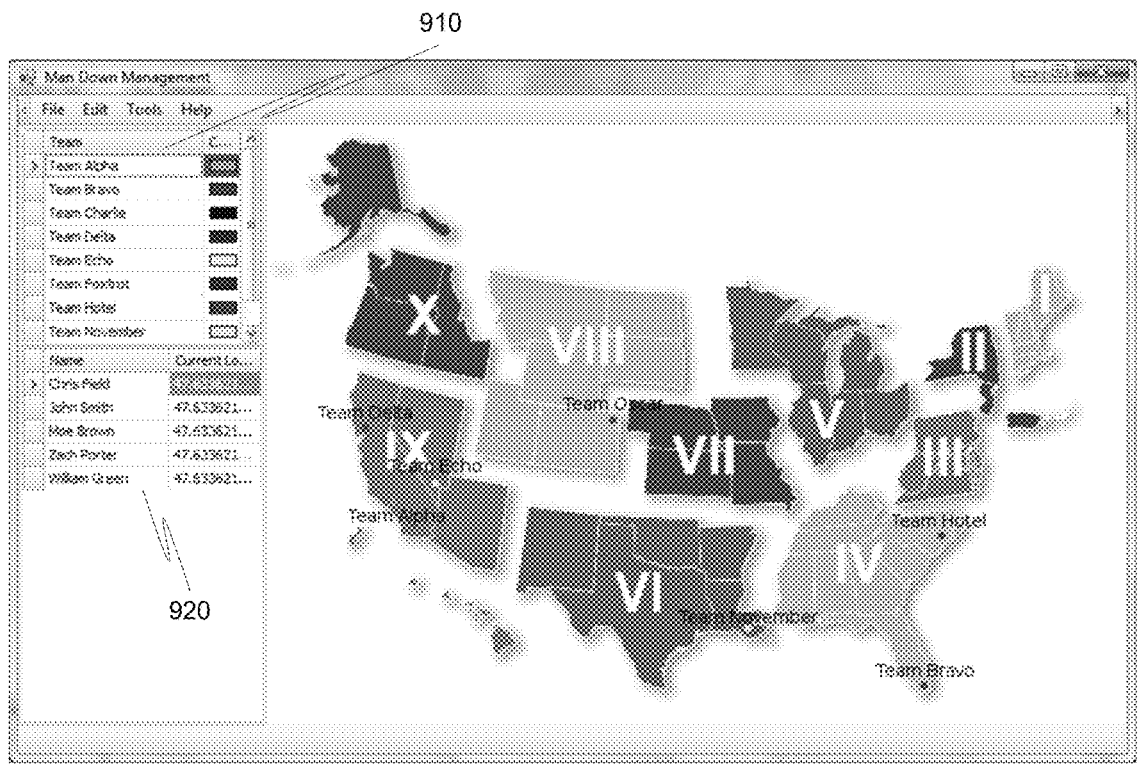
FIG. 9 illustrates an exemplary national view of team management according to this invention.
Figure 10:
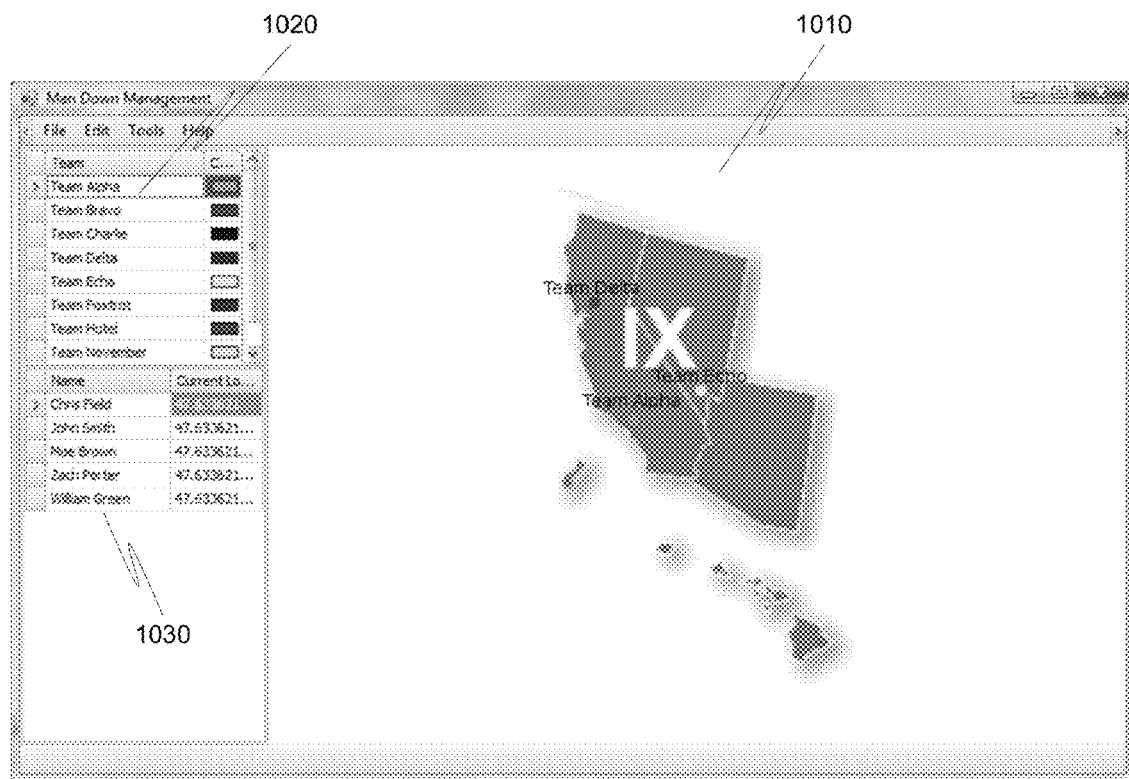
FIG. 10 illustrates an exemplary view of regional team management according to this invention.
Figure 11:
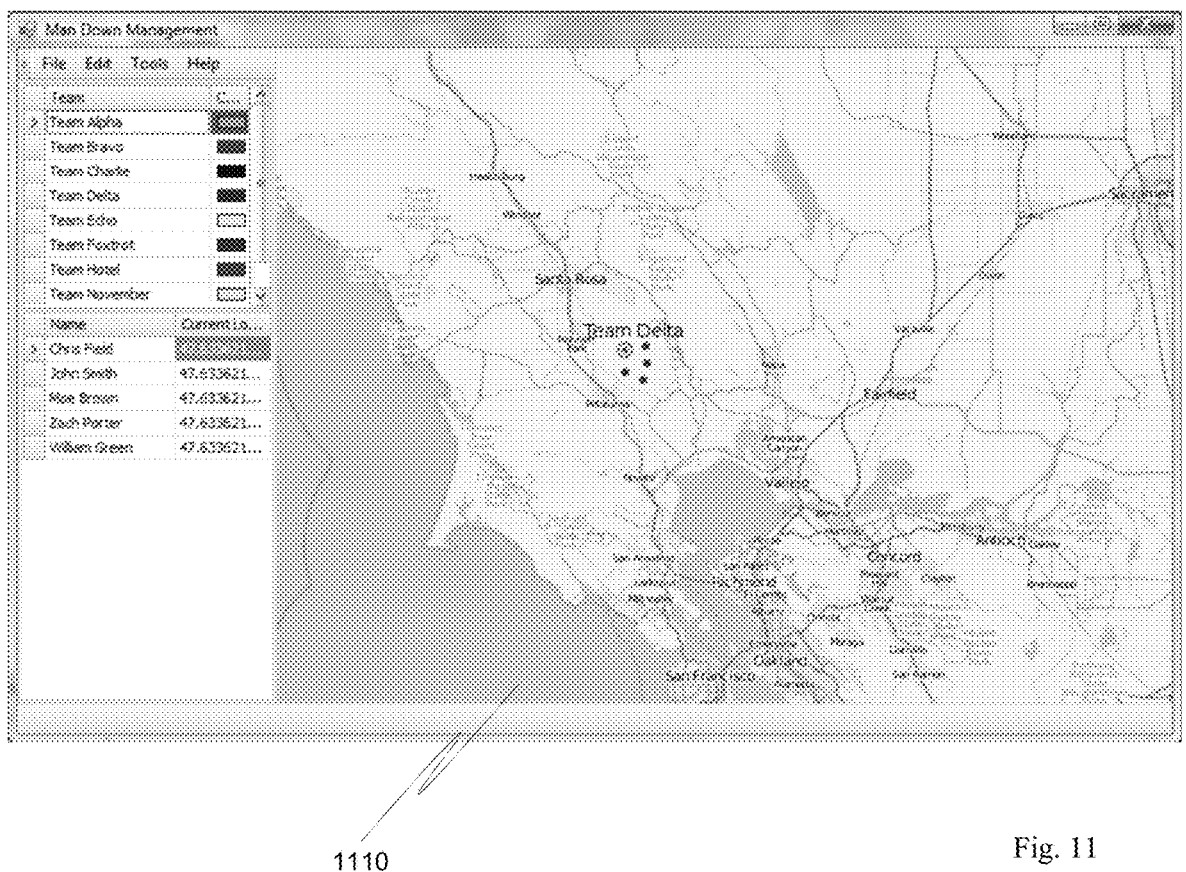
FIG. 11 illustrates an exemplary team map according to this invention.

FIGS. 9-11 illustrate exemplary views that can be provided, for example, to a user associated with a client, or the server. Typically these views would be used by, for example, an incident commander, team lead, or the like. In FIG. 9, a national incident command view is shown, in which a country is divided into regions with optional team information within specific regions being shown. One or more teams can be color coded, such as illustrated in interface portion 910, and upon selection of a particular team, the details thereof provided in interface portion 920. In interface portion 920, various types of information such as name information, current location information, and the like can be provided. The interface in FIG. 9 can be dynamic, and selectable such that a user is able to drill down and, upon selection of region, view interface 1010 as illustrated in FIG. 10. In the interface 1010, an expanded view of region 9 is shown, which specific team information populated thereon again with the team information optionally being shown in portion 1020 with detailed information, upon selection of a specific team, illustrated in display portion 1030.

The interface in FIG. 11 shows another exemplary embodiment where even more detailed information is available upon drilling down into the interface shown in FIG. 10. In this exemplary embodiment, the map information has been updated to also include street and town names, with more specific locations of the teams being provided in display 1110. As with the other embodiments, team information, and specific information about the team can also be optionally displayed upon selection of team.

Figure 12:
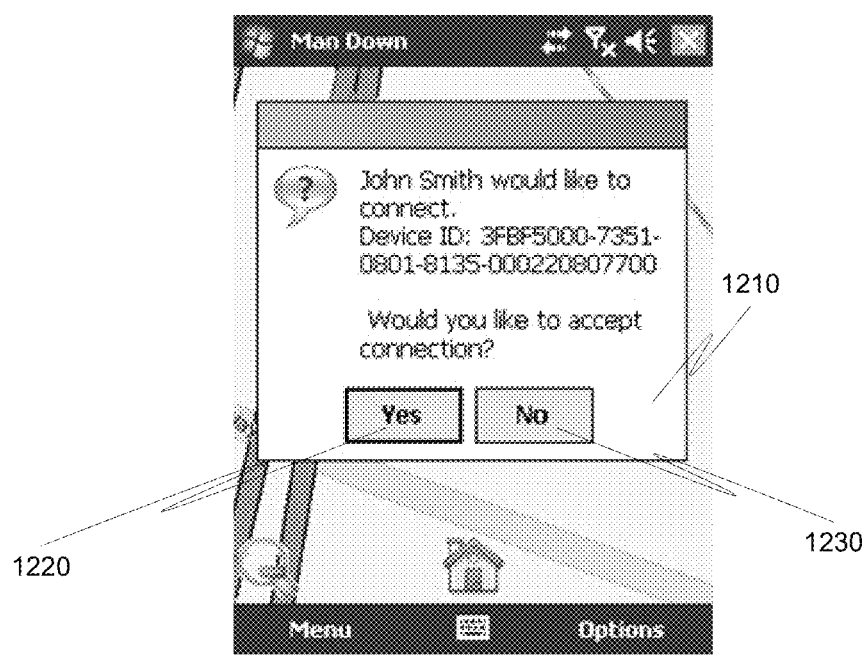
FIG. 12 illustrates an exemplary connection request according to this invention.

FIG. 12 illustrates an exemplary interface that can be displayed to a user, with the cooperation of the interface management module 245 and communications module 235 upon a request from another user to connect to the device. For example, interface 1210 can be provided that allows a user to select whether or not they would like to accept a connection from another user. Upon selection of the yes icon 1220, the other user is allowed to connect. In contrast, upon selection of the no icon 1230, the other user, in this instance "John Smith" would not be allowed to connect. In the event of allowing John Smith to connect, this connection can allow another user to share information. The interface 1210 can show, for example, the user's name as well as, for example, a unique ID that is being used, such as a device ID, global universal ID (GUID), universal unique identifier (UUID), certificate, digital certificate, or the like, one or more of (or combinations thereof) are associated with the team/device/user. The device ID could also be a composite of various information such as a GUID and Subscriber Identity Module information and/or device information.

In accordance with one exemplary embodiment that may be particularly useful for first responders, or the like, upon being issued a credential with a GUID, a cardholder's identity, skills and certifications can be authenticated with a very high degree of assurance at, for example, an emergency site. Administrative officials are able to manage identity information for one or more jurisdictions and the system is capable of lifecycle management and high-availability replication of identity repositories. The GUID allows a more efficient replication of identity information than prior techniques, such as PKI certificate exchange. The GUID can also be used as a public key or an encrypting key where there is a need to secure data. The encryption process can be weak or strong using either the stand-alone GUID that represents an identity or by using a combination of the NGUID (NetworkGUID), IGUID (ImpactGUID), device ID or GUID, and/or the DGUID (DataGUID). Each user can have one unique GUID that is generated when, for example, a new account is created within the system that follows that user. Network related data and other data that can be related to physical access, certifications, medical or other data can be tied to the user by creating table relationships that correlate the one or more of the various GUIDS being used.

In this manner, additional data entries or fields can be created that apply to any GUID being used.

To assist with the management of identifiers, as mentioned above, and to provide better replication capabilities and bridging (e.g., a First Responder Access Command and Control Bridge—FRACC-Bridge) between one or more entities, such as the regions identified herein, a composite GUID can be used with the systems and techniques disclosed herein. For example, this composite GUID can facilitate forensic trackability, rapid transferability among regions, entities, groups, teams, of the like. This composite GUID can, for example, be generated in the field, recognized, exchanged, and utilized by multiple entities, such as government agencies, to facilitate a multi-agency response.

For example, and in cooperation with the access control module 130, a new record can be created that governs access to one or more of the server 100 and other clients 200. With the adding of the new record to the access control module 130, a first server can replicate the record in a transactional manner, can replicate the record via a snapshot as part of an automated maintenance process, or the like, thus allowing for new records to be synchronized as they are added, modified, or deleted, amongst multiple servers that may, for example, be located in different regions. These data replications can be based on one or more identifiers, such as a GUID. For example, data can be correlated through a GUID look-up table. When a new user is added, a new GUID is created at a first location. This look-up table can be a joining table which joins the other data structures using GUIDs as a primary key for other complementary sets of data. Each user's GUID can stay with them wherever they go even though they may be going to different networks, and different locations, at different periods of time.

The basis of this bridging ability is the use of the GUID for correlating data. In addition, the GUID can be used as a public key or an encrypting key as discussed above. Furthermore, and as discussed above, each user can have a unique GUID that is generated when a new account is created within the system, which can be used wherever they go. In more detail, multiple types of GUIDs, such as a network GUID, data GUID, user GUID, and the like, can be utilized to generate a composite GUID that allows the derivation of such information such as on which network the GUID was created, in which region the GUID was created, at which site the GUID was created, and in general any information about the historical properties of the GUID. For example, the network GUID can include information about a user's account within a specific network structure. Since there can be a master to the network GUID, users can be part of multiple networks and still be referenced to one unique identity. A network GUID can be, for example, correlated to the active directory GUID, or a security identifier that can be unique to each network. The table structures that maintain various types of information can be relational in nature and can be pushed to marts or warehouses for further analysis and optionally used to tie in all other relevant data that applies to an entity. This can be, for example, physical access data which can be pushed to readers or access card databases and any other data to include, but not limited to, certifications, medical data, such as blood type, and the like, scheduling data, or in general, any data that is a subset of an entity. The general data depiction described above can optionally be a series of related tables that tie to a master record by means of the data GUID. This master record can then be related amongst one or more data tables.

FIG. 13 illustrates an exemplary map interface that can be shown on the device 200 in cooperation with the client module 205, location module 215, and mapping module 240. For example, once one or more users have connected, the users can appear on the map for a visual representation of their location. Upon selection of any one or more of the users within the interface 1310, additional information about that user can be shown, as well as direction and distance information provided to that user. In a similar manner, two users could be selected, with distance and direction information between the users provided in the display 1310.

Figure 14:
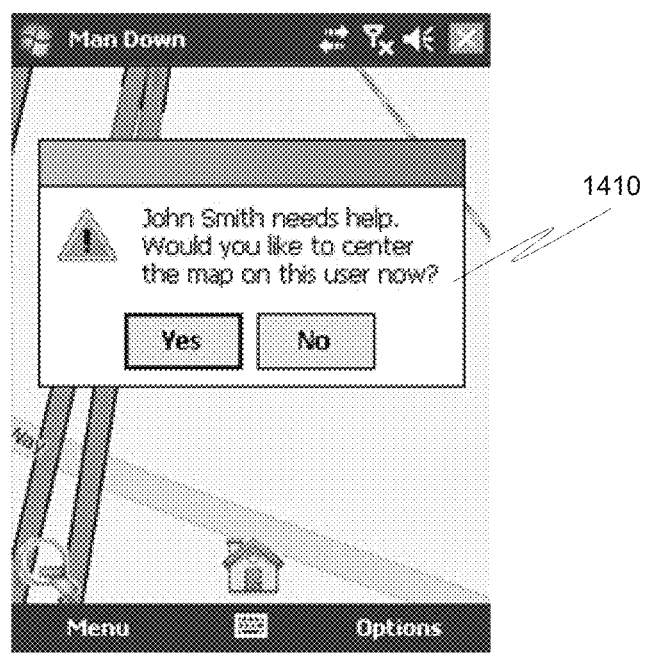
FIG. 14 illustrates an exemplary help request according to this invention.
Figure 15:
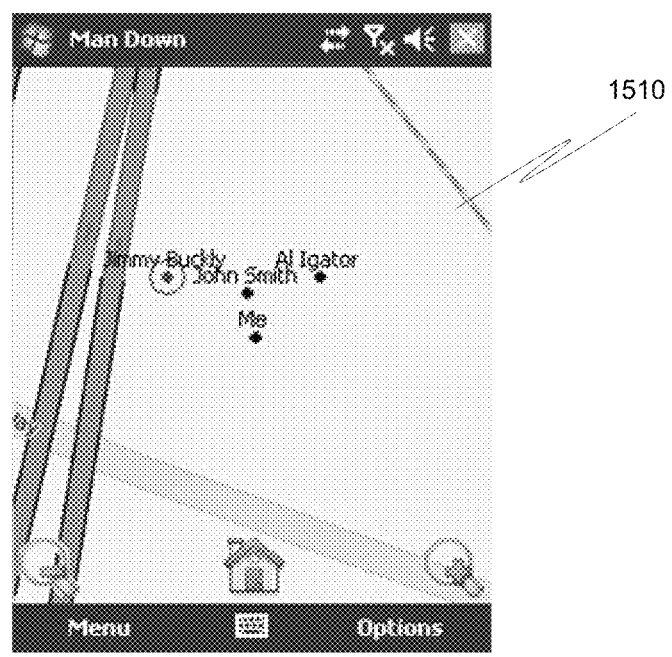
FIG. 15 illustrates an exemplary map associated with a help request according this invention.

FIGS. 14 and 15 illustrate exemplary interfaces that can be provided when a user requests help. For example, upon selection of the help icon, and in cooperation with the alerting module 225 and communications module 235, location information, in cooperation with the location module 215 is sent to one or more destinations. A result of this alert can be, for example, the pop-up 1410 that indicates that John Smith has requested help and is prompting the user as to whether or they would like to re-draw the map based on the location information associated with John Smith. Upon selection of the yes icon, interface 1510 can be provided where the map has been centered on the user that has requested help, and optionally an animation provided that illustratively highlights where the user who requested help is located. For example, this could be a blinking icon, a change in color, a beacon-movement of an icon associated with the user, or in general a method which helps the recipient of the alert message to identify the location of the help requestor.

Figure 16:
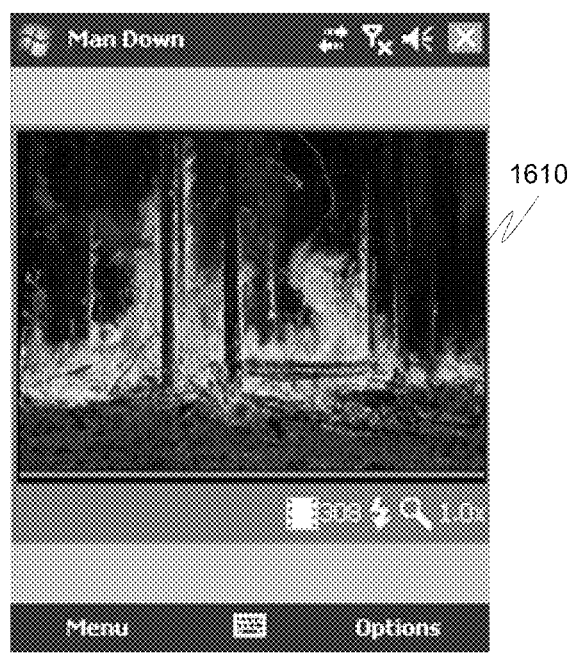
FIG. 16 illustrates an exemplary communicated image according to this invention.

FIG. 16 illustrates an exemplary interface 1610 as a result of a user selecting a snapshot or video icon. As discussed, this functionality can be used to assist with capturing a picture or video of an incident that could, for example, be forwarded to one or more other users and/or servers.

Figure 17:
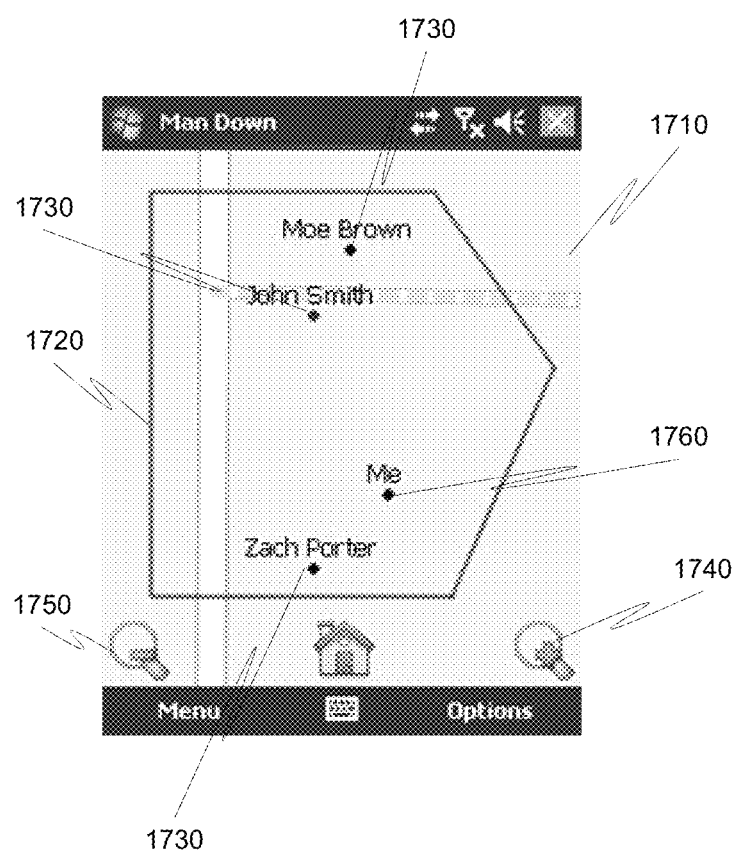
FIG. 17 illustrates an exemplary perimeter according to this invention.

FIG. 17 illustrates an exemplary interface 1710 that includes a perimeter 1720. As discussed, upon entry or exit from this perimeter, an alert can be generated in cooperation with the alerting module 225 and the perimeter module 220. As illustrated in FIG. 17, a plurality of users 1730 are shown within the perimeter, as well as the current location of the user 1760. In addition, optional zoom icons 1740 and 1750 can be provide that allow manipulation of the interface 1710.

Figure 18:
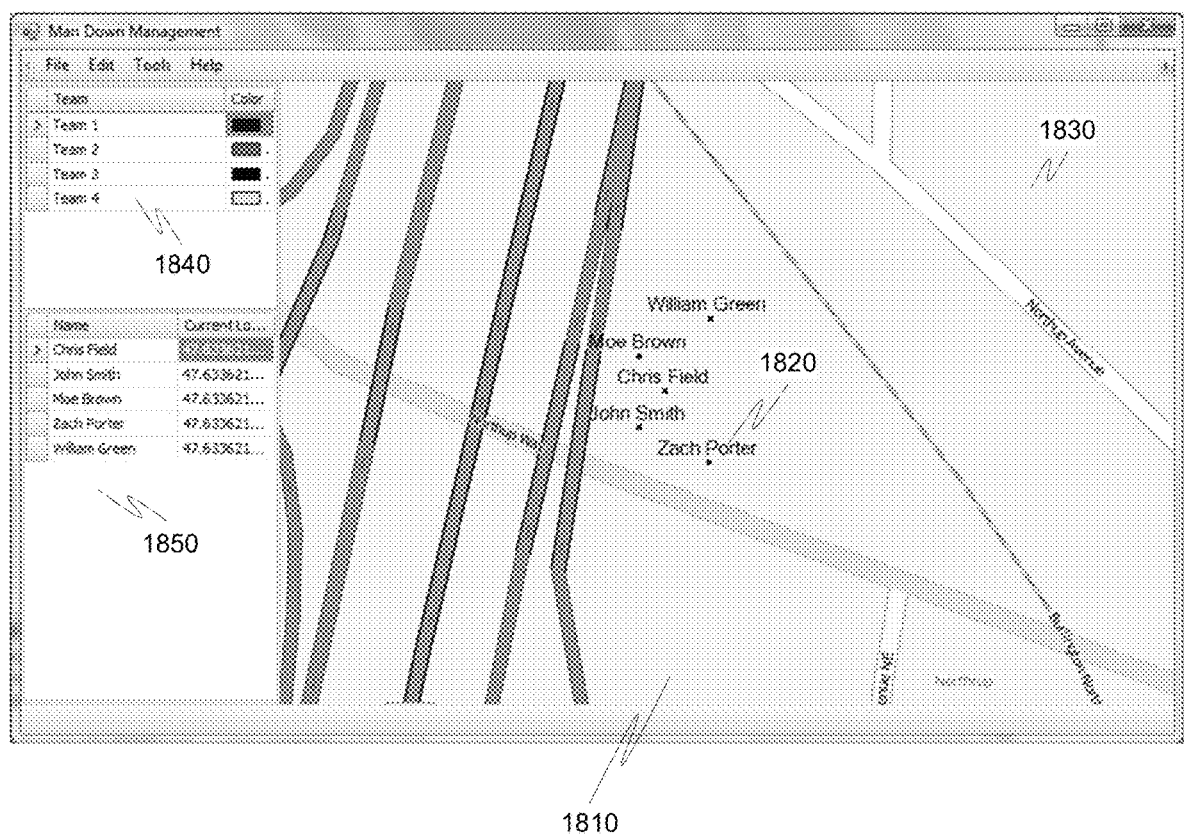
FIG. 18 illustrates an exemplary team management interface according to this invention.

FIG. 18 illustrates another exemplary interface 1810 that shows some of the capabilities of the server 100. Here, individual users 1820, maps 1830, team information 1840, and user 1850 are all displayed with each being selectable to provide, for example, additional information about the selection. This interface 1810 can be, for example, a management interface that is displayed for a user associated with the server in cooperation with the corresponding modules.

Figure 19:
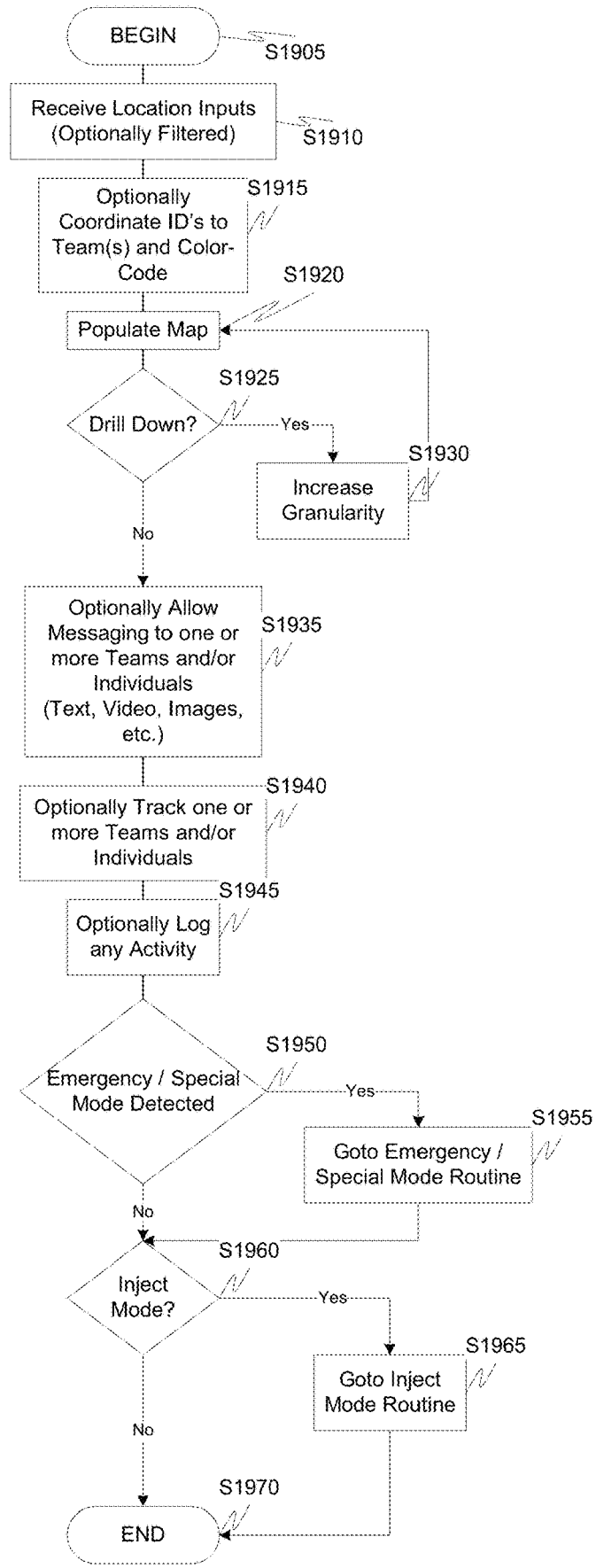
FIG. 19 is a flow chart outlining an exemplary method for tracking individuals according to this invention.

FIG. 19 illustrates an exemplary method of operation of a server. In particular, control begins in step S1905 and continues to step S1910. In step S1910, location information for one or more users is received. This information can optionally be filtered, such that only location information for a specific team, specific region, or the like, is received. This filtering can be selectable based on, for example, a desired area of interest, a set of clients, and/or a set of users. Next, in step S1915, the location information can optionally be correlated to one or more associated teams, and further optionally color coordinated. For example, as illustrated in FIGS. 9 and 10, the teams are indicated by a certain color of a dot placed on the map. Then, in step S1920, the location information is used to place an indication thereof of the location of the client on a map. As discussed, this map could also be populated with additional information, such as street information, topographical information, weather information, or the like, as discussed. Control then continues to step S1925.

In step S1925, a determination is made whether a drill down request has been received. If a drill down request has been received, control continues to step S1930 where additional information can be provided about the drilled down area. Control then jumps back to step S1920 where the map is re-rendered with the additional information. Otherwise, control continues to step S1935.

In step S1935, messaging, such as text messaging, video messaging, chat, images, multimedia, and the like, can be sent from the server to one or more clients. Next, and optionally in step S1940, the server can be configured to track one or more teams and/or individuals associated with the client. For example, by selecting a specific team in a management interface, information about that team can be displayed with the tracking of that team shown on a corresponding map. Then, in step S1945, and as discussed herein, logging can optionally occur with the logging recording any aspect of the operation of one or more of the server and client(s). Control then continues to step S1950.

In step S1950, a determination is made whether an emergency or special mode requests has been detected. If so, control continues to step S1955 with control otherwise jumping to step S1960.

In step S1955, an emergency and/or special mode routine can be run. As discussed, this emergency or special mode can force a client to operate in a particular manner, and perform certain automated or semi-automated functions, and can be done with or without the permission and/or knowledge of the user associated with the client. As will be appreciated, since the server can force this special or emergency mode, the server can also be used to have the client exit from this mode, for example when the emergency situation has ended.

In step S1960, a determination is made whether the inject mode is to be entered. If the inject mode is to be entered, control continues to step S1965 with control otherwise jumping to step S1970 where the control sequence ends.

In step S1965, control jumps to the inject mode routine which will be discussed in greater detail in relation to FIG. 25.

Figure 20:
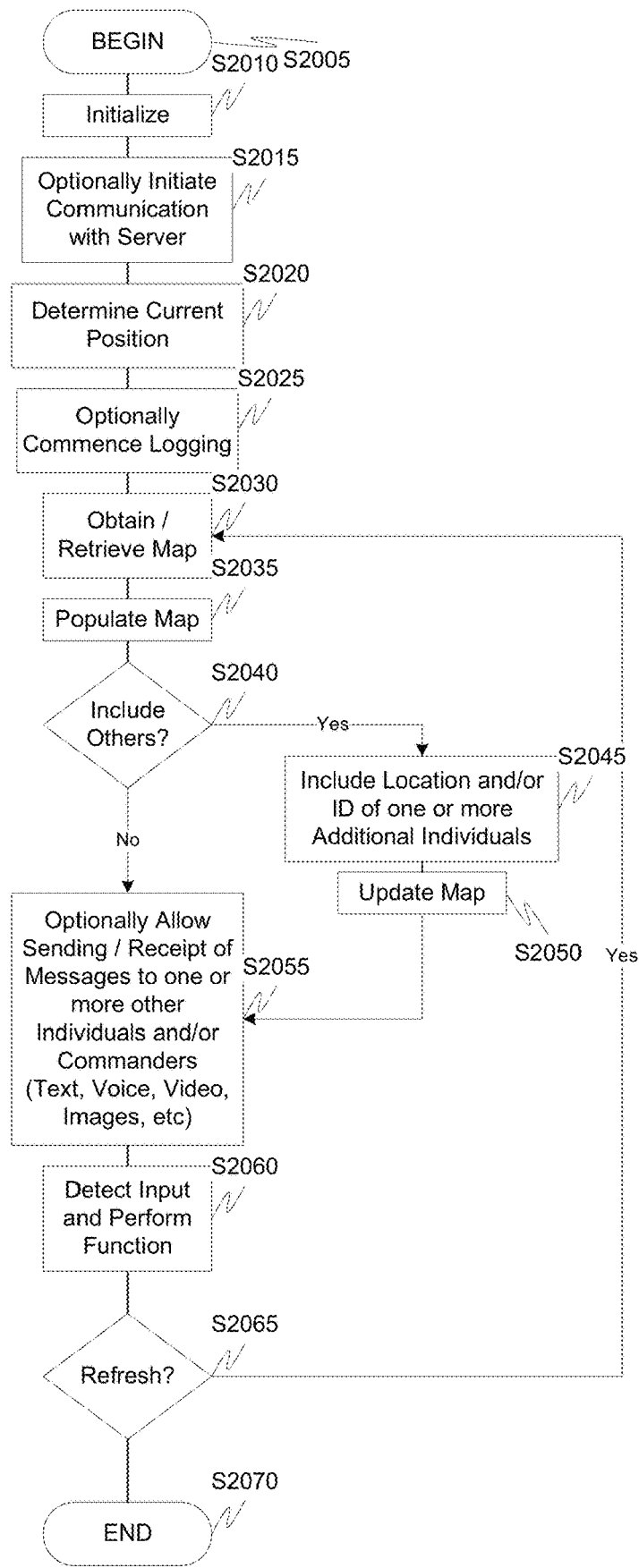
FIG. 20 is a flow chart outlining an exemplary method of the operation of the Man Down client according to this invention.

FIG. 20 illustrates and exemplary mode of operation of a client. In particular, control begins in step S2005 and continues to step S2010. In step S2010, the client is initialized. Next, in step S2015, communication with a server can optionally be initiated. Then, in step S2020, current position information is determined and optionally sent to one or more other clients and the server. Control then continues to step S2025.

In step S2025, and as discussed, logging can optionally commence. Next, in step S2030, map information can also optionally be obtained and/or retrieved such that the map can be displayed in step S2035. As discussed, the various characteristics and/or layers of the map can also be customized and/or selected by a user via a corresponding interface. Then, in step S2040, a determination is made whether one or more other clients are to be populated on the map. If so, control continues to step S2045 where one or more of the location and/or identification of the other clients that are to be included are obtained, and populated on the map in step S2050. Control then continues to step S2055.

In step S2055, and upon the selection of one or more other users and/or a server, the sending and receiving of messages can be enabled such that communications can be exchanged between any one or more members. Control then continues to step S2060.

In step S2060, one or more inputs are received that govern the operation of the device. For example, these inputs can correspond to selectable icon shown in FIG. 2 and allow a user to control the various operational characteristics of the client. Upon selection of any one or more of these icons, in step S2065, a determination is made as to whether a refresh is required, with a refresh being required having control jump back to step S2030. Otherwise, control continues to step S2070 where the control sequence ends.

Figure 21:
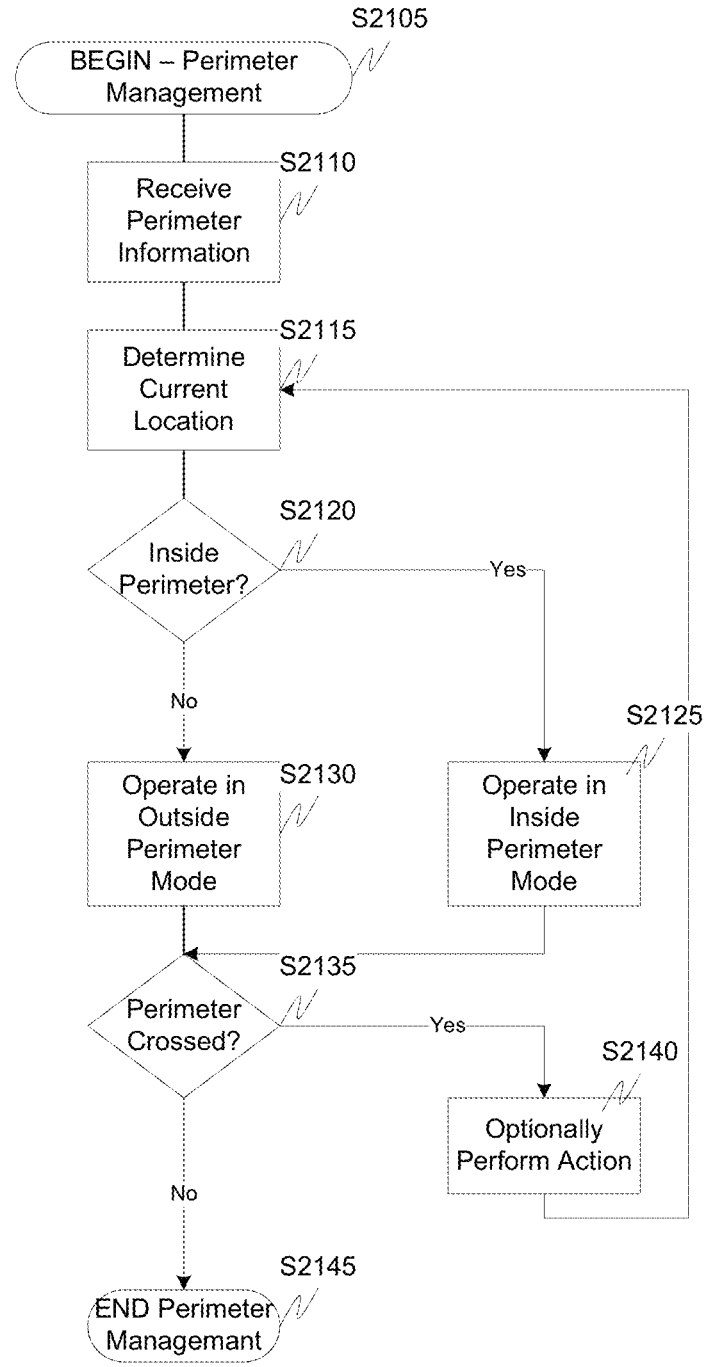
FIG. 21 is a flow chart outlining an exemplary method for perimeter management according to this invention.

FIG. 21 outlines an exemplary method for perimeter management according to this invention. In particular, control begins in step S2105 and continues to step S2110. In step S2110, perimeter information is received. As discussed, this can be based on one or more of latitude/longitude information, GPS information, or the like, and in general can be based on any information that defines a geographic perimeter. Next, in step S2115, a current location is determined. Then, in step S2120, a determination is made whether the current location is inside or outside of the perimeter. If it is determined that the current location is inside the perimeter, control continues to step S2125, with control otherwise jumping to step S2130.

In step S2125, the client can optionally operate in an inside of the perimeter mode. Control then continues to step S2135.

In step S2130, and if the current location is outside the perimeter, the client can optionally operate in an outside of the perimeter mode. Control then continues to step S2135.

In step S2135, a determination is made whether the perimeter has been crossed. If the perimeter has been crossed, control continues to steps S2140, where one or more actions can optionally be performed.

The above step(s) can continue to be performed until control continues to step S2145 where the control sequence ends.

In step S2140, one or more actions can automatically, semi-automatically, and/or surreptitiously be performed based on the crossing of a perimeter. As discussed, these actions can include, but are not limited to, one or more of alerts, triggering a special mode of operation of the client, or the like. Control then continues back to step S2115 to determine the new current location of the client.

Figure 22:
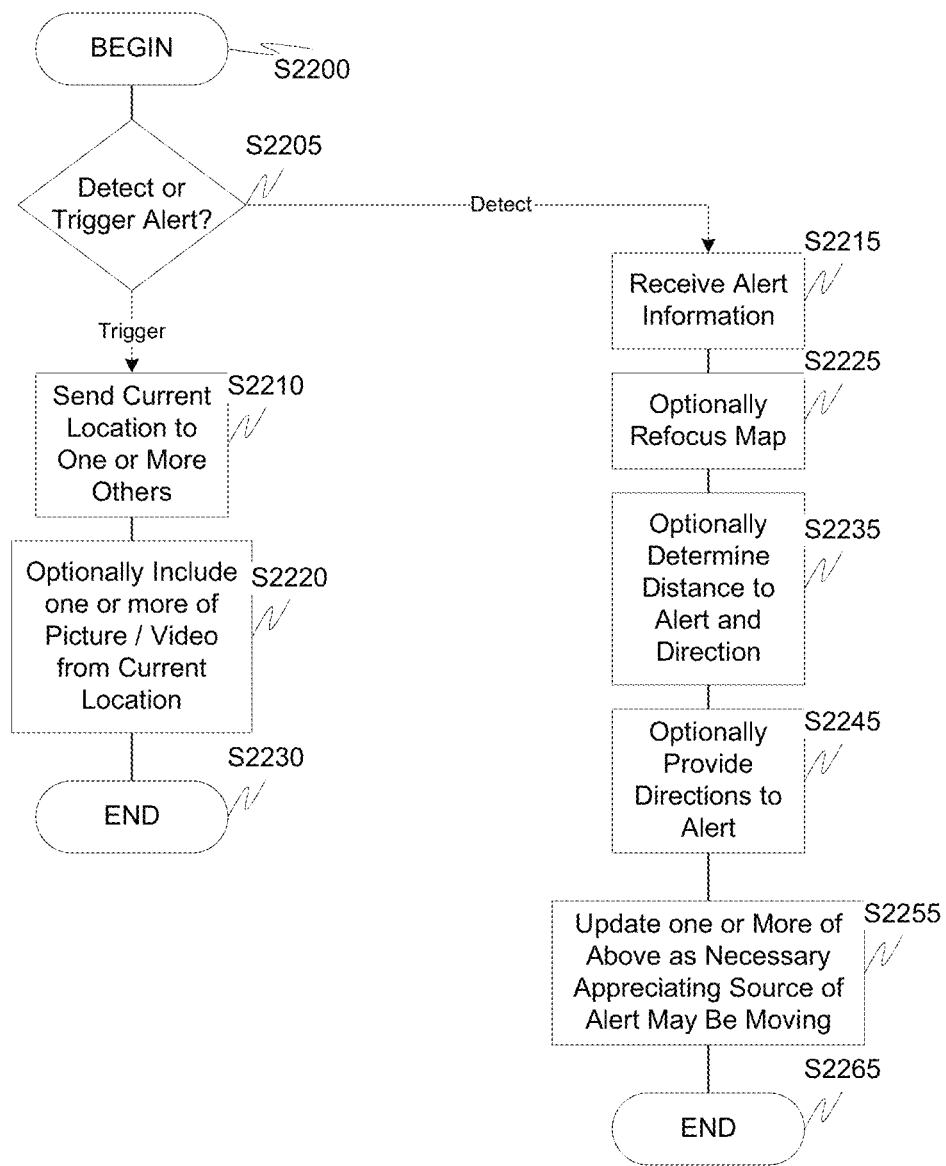
FIG. 22 is a flow chart outlining an exemplary alert method according to this invention.

FIG. 22 outlines an exemplary method of alerting according to this invention. In particular, control begins in step S2200 and continues to step S2205. In step S2205, a determination is made whether an alert has been detected, or an alert should be triggered. If an alert has been detected, control continues to step S2215. Otherwise, if an alert is triggered, control jumps to step S2210.

In step S2210, current location information can optionally be sent to one or more destinations. Next, in step S2220, one or more of pictures, videos, and multimedia information can optionally be sent from the current location to one or more destinations. Control then continues to step S2230 where the control sequence ends.

Alternatively, if an alert is detected, in step S2215, alert information is received at one or more other clients and/or servers (or other predefined destinations). Next, in step S2225, maps on the devices that receive the alert can optionally be refocused and/or zoomed in to show, for example, the current location of the client that sent the alert. Then, in step S2235, one or more of a distance and direction to the alert can optionally be determined on one or more of the alert receiving devices. Control then continues to step S2245.

In step S2245, directions to the device sent the alert can optionally be provided to the one or more alert receiving clients. Next, in step S2255, any one or more of step S2215-S2245 can be updated as necessary, appreciating that the source of the alert may be moving. Control then continues to step S2265 where the control sequence ends.

Figure 23:
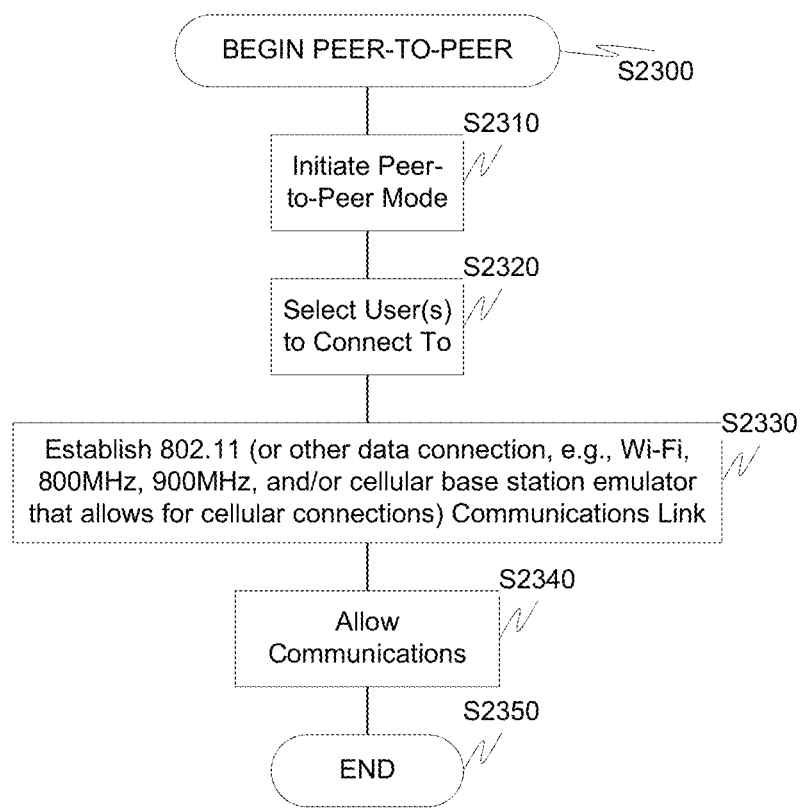
FIG. 23 is a flow chart outlining an exemplary method for peer-to-peer communication according to this invention.

FIG. 23 outlines an exemplary method of a peer-to-peer network according to this invention. In particular, control begins in step S2300 and continues to step S2310. In step S2310, the peer-to-peer mode is initiated. As discussed, this can be based on one or more of Wi-Fi®, Bluetooth, 802.11, or in general, any wireless communication protocol that can be established between one or more devices. Next, in step S2320, one or more users are selected to connect to. Then, in step S2330, a connection is established between the one or more selected users that allow, in step S2340, communications therebetween. Control then continues to step S2350 where the control sequence ends.

Figure 24:
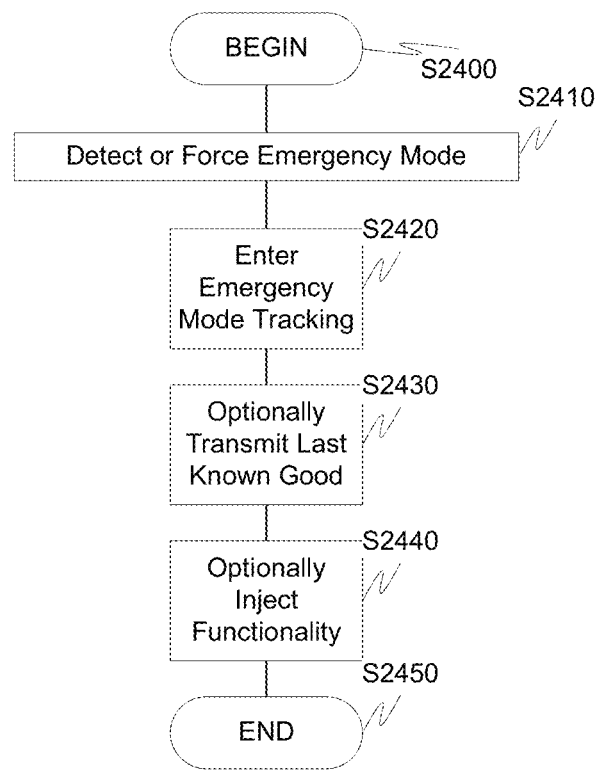
FIG. 24 is a flow chart outlining an exemplary method of operation for an emergency mode according to this invention.

FIG. 24 outlines an exemplary method for an emergency or special mode of operation according to this invention. In particular, control begins in step S2400 and continues to step S2410. In step S2410, a request to enter an emergency mode can be detected, or a forced emergency mode can be initiated, for example, with the cooperation of the injection techniques disclosed herein. Then, in step S2420, the emergency mode is entered. As discussed, and in accordance with one exemplary embodiment, the emergency mode allows for emergency tracking of a client(s). For example, in a child abduction type scenario, the device can surreptitiously enter this mode, such that the abductor is unaware that the client is operating in a special emergency mode of operation. Control then continues to step S2430.

In step S2430, the last known good position can optionally be transmitted. For example, in the event of the battery almost being fully depleted, limited connectivity, or the like, a last known good position can be transmitted to a server. Next, in step S2440, the inject functionality as discussed herein can optionally be performed with control continuing to step S2450 where the control sequence ends.

Figure 25:
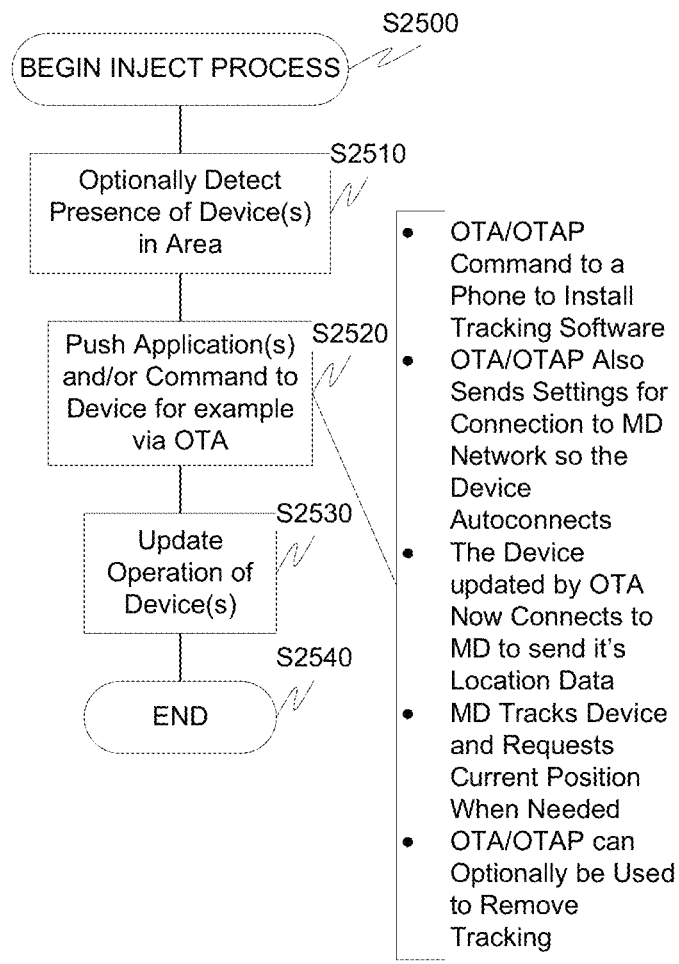
FIG. 25 is flow chart outlining an exemplary method for software injection according to this invention.

FIG. 25 outlines an exemplary operation of the inject functionality. More particularly, control begins in step S2500 and continues S2510. In step S2510, the presence of one or more devices in a specific area can optionally be detected. For example, this can occur when the communication device(s) establishes communications with, for example, one or more local cell towers, Wi-Fi hotspots, or in general any communications mode or tower. Next, in step S2520, one or more of applications, commands, parameters, and the like, can be pushed to one or more of the detected devices within the predefined area using one or more of, for example, OTA and/or OTAP or comparable technologies. Then, in step S2530, the operation of the device can optionally be updated, based on, for example, one or more of the pushed applications, software, parameters, or the like. Control then continues to step 2540 where the control sequence ends.

Figure 26:
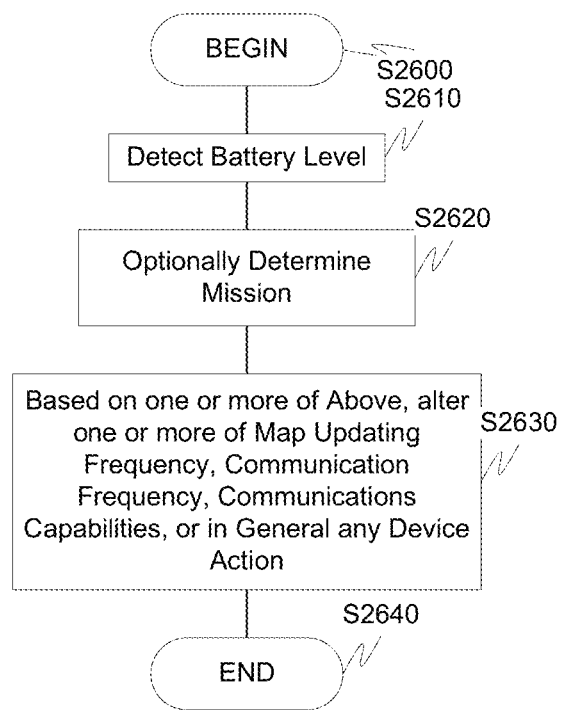
FIG. 26 is a flow chart outlining an exemplary method for operations management based on the detected battery level according to this invention.

FIG. 26 outlines an exemplary mode of operation where detected battery level can be used to govern client functionality. In particular, control begins in step S2600 and continues to step S2610. In step S2610, the battery level is detected. Next, in step S2620, mission information can optionally be assessed. For example, if it is known that the client has been deployed on a mission that is to last 14 days, this can be factored in to assist with determining how much battery will be required to last the duration of the mission. This can be feed into an equation that assists with managing how frequently, for example, the transmitter in the mobile device should be powered on. Similarly, this can control such operations, as back light display, display on time, or in general any function of the client. Then in step S2630, and based on one or more of the detected battery level, and mission information, one or more of map updating frequency, communication frequency, communications capabilities, or in general any device action or capability is modified and/or managed. Control then continues to step S2640 where the control sequence ends.

The above-described methods and systems and can be implemented in a software module, a software and/or hardware module, a management device or interface, a wired and/or wireless wide/local area network system, a satellite communication system, network-based communication systems, such as an IP, Ethernet or ATM system, ROM, or the like, or on a separate programmed general purpose computer having a communications device or in conjunction with a wired or wireless communications protocol.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a ROM, secure ROM, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various methods, protocols and techniques according to this invention. While the systems and means disclosed herein are described in relation to various functions that are performed, it is to be appreciated that the systems and means may not always perform all of the various functions, but are capable of performing one or more of the disclosed functions.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a non-transitory computer-readable storage medium and/or ROM, executed on programmed general-purpose computer with the cooperation of a controller and memory, a special purpose computer, a microprocessor, or the like. In these instances, the systems and methods of this invention can be implemented as program embedded on personal computer such as an applet, API, JAVA® or CGI script, as a resource residing on a server or computer workstation, as a routine embedded in a dedicated communication system or system component, or the like. The system can also be implemented by physically incorporating one or more portions of the system and/or method into a software and/or hardware system, such as the hardware and software systems of mobile device.

While the invention is described in terms of exemplary embodiments, it should be appreciated that individual aspects of the invention could be separately claimed and one or more of the features of the various embodiments can be combined.

While the systems and means disclosed herein are described in relation to various functions that are performed, it is to be appreciated that the systems and means may not always perform all of the various functions, but are capable of performing one or more of the disclosed functions.

While the exemplary embodiments illustrated herein disclose the various components as collocated, it is to be appreciated that the various components of the system can be located at distant portions of a distributed network, such as a telecommunications network and/or the Internet or within a dedicated communications network. Thus, it should be appreciated that the components of the system can be combined into one or more devices or collocated on a particular node of a distributed network, such as a communications network. As will be appreciated from the following description, and for reasons of computational efficiency, the components of the communications network can be arranged at any location within the distributed network without affecting the operation of the system.

It is therefore apparent that there has been provided, in accordance with the present invention, systems and methods for tracking and managing one or more mobile devices. While this invention has been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this invention.

The invention claimed is:

1. In a network designed to communicate with a plurality of mobile communication devices, a method comprising:
    establishing, at a first location, communication with at least one alert system;
    obtaining, at said first location, from said alert system, information associated with a condition, said condition being associated with a second location distinct from said first location;
    determining, at said first location, a perimeter, said perimeter defined at least in part based on a proximity to said second location, wherein said first location is not located within said perimeter;
    obtaining, at said first location, from a first set of mobile communication devices from said plurality of mobile communication devices that are located within said perimeter, location data comprising one or more of global positioning system data, satellite triangulation data, cell tower triangulation data, or access point data, wherein said first set of mobile communication devices is separate from a second set of mobile communication devices from said plurality of mobile communication devices not located within said perimeter;
    identifying, at said first location, based on said location data, said first set of mobile communications devices located within said perimeter;
    providing map information for display at said first location, wherein said map information includes said second location;
    causing one or more of text-based, multimedia-based, image-based, voice-based and video-based push notifications associated with said condition be communicated to said first set of mobile communication devices located within said perimeter;

after causing said push notifications to be communicated to said first set of mobile communication devices, receiving a detection that at least one mobile communication device from said second set of mobile communication devices has traversed said perimeter; and in response to said detecting, causing one or more of text-based, multimedia-based, image-based, voice-based and video-based push notifications associated with said condition to be communicated to said mobile communication device from said second set of mobile communication devices that has traversed said perimeter;

wherein said information associated with a condition is received at said first location from a device other than one of said plurality of mobile communications devices.

2. The method of claim 1, further comprising monitoring the location of the mobile communications device relative to one or more perimeters, and taking one or more actions based on a crossing of a perimeter.

3. The method of claim 1, further comprising establishing peer-to-peer communications between the mobile communications device and one or more other communications devices.

4. The method of claim 1, further comprising managing device functionality based on one or more of remaining battery power and mission information.

5. The method of claim 1, further comprising establishing communications between the mobile communications device and one or more of other communications devices, a server and another endpoint.

6. The method of claim 1, further comprising surreptitiously receiving one or more of software, parameters and communications device updates.

7. The method of claim 1, wherein the mobile communications device is tagged such that the mobile communications device can be tracked.

8. The method of claim 1, further comprising causing the mobile communications device to enter a special operational mode, wherein the mobile communications device performs one or more automated functions.

9. The method of claim 1, further comprising causing the mobile communications device to perform one or more automatic functions.

10. The method of claim 1, further comprising causing a server to maintain location information for one or more mobile communications devices and exchange one or more of text-based, multimedia-based, image-based, voice-based and video-based communications with the one or more mobile communications devices.

11. A device for use in a network designed to communicate with a plurality of mobile communication devices comprising:

a processor configured to receive global positioning system data, satellite triangulation data, cell tower triangulation data, and access point data; and a non-transitory computer readable storage media having instructions stored thereon, that when executed, cause to be performed the following steps:

establishing, at a first location, communication with at least one alert system;

obtaining, at said first location, from said alert system, information associated with a condition, said condition being associated with a second location distinct from said first location;

determining, at said first location, a perimeter, said perimeter defined at least in part based on proximity to said second location, wherein said first location is not located within said perimeter;

obtaining, at said first location, from a first set of mobile communication devices from said plurality of mobile communication devices that are located within said perimeter, location data comprising one or more of global positioning system data, satellite triangulation data, cell tower triangulation data, or access point data, wherein said first set of mobile communication devices is separate from a second set of mobile communication devices from said plurality of mobile communication devices not located within said perimeter;

identifying, at said first location, based on said location data, said first set of mobile communications devices located within said perimeter;

providing map information for display at said first location, wherein said map information includes said second location;

causing one or more of text-based, multimedia-based, image-based, voice-based and video-based push notifications associated with said condition to be communicated to said first set of mobile communication devices located within said perimeter;

after causing said push notifications to be communicated to said first set of mobile communication devices, receiving a detection that at least one mobile communication device from said second set of mobile communication devices has traversed said perimeter; and in response to said detecting, causing one or more of text-based, multimedia-based, image-based, voice-based and video-based push notifications associated with said condition to be communicated to said mobile communication device from said second set of mobile communication devices that has traversed said perimeter;

wherein said information associated with a condition is received at said first location from a device other than one of said mobile communications devices.

12. The device of claim 11, wherein said instructions, when executed, further cause monitoring the location of the mobile communications device relative to one or more perimeters, and taking one or more actions based on a crossing of a perimeter.

13. The device of claim 11, wherein said instructions, when executed, further cause establishing peer-to-peer communications between the mobile communications device and one or more other communications devices.

14. The device of claim 11, wherein said instructions, when executed, further cause managing device functionality based on one or more of remaining battery power and mission information.

15. The device of claim 11, wherein said instructions, when executed, further cause establishing communications between the mobile communications device and one or more of other communications devices, a server and another endpoint.

16. The device of claim 11, wherein said instructions, when executed, further cause surreptitiously receiving one or more of software, parameters and communications device updates.

17. The device of claim 11, wherein the mobile communications device is tagged such that the mobile communications device can be tracked.

18. The device of claim 11, wherein said instructions, when executed, further cause the mobile communications device to enter into a special operational mode, wherein the mobile communications device performs one or more automated functions.

19. The device of claim 11, wherein said instructions, when executed, further cause the mobile communications device to perform one or more automatic functions.

20. The device of claim 11, further comprising a server that maintains location information for one or more mobile communications devices and is capable of exchanging one or more of text-based, multimedia-based, image-based, voice-based and video-based communications with the one or more mobile communications devices.

* * * * *